US006460421B1

(12) United States Patent
Hasegawa et al.

(10) Patent No.: US 6,460,421 B1
(45) Date of Patent: Oct. 8, 2002

(54) GOVERNOR CONTROLLED ON A BASIS OF LOAD DETECTION

(75) Inventors: Toshiyuki Hasegawa, Amagasaki (JP); Toru Inoue, Inadera amagasaki (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 15 days.

(21) Appl. No.: 09/604,813

(22) Filed: Jun. 28, 2000

(30) Foreign Application Priority Data

| | | |
|---|---|---|
| Jun. 30, 1999 | (JP) | 11-186705 |
| Aug. 23, 1999 | (JP) | 11-236051 |
| Dec. 28, 1999 | (JP) | 11-372508 |

(51) Int. Cl.[7] .......... G01L 3/02
(52) U.S. Cl. .......... 73/862.29
(58) Field of Search .......... 73/862.26, 118.2; 60/711; 137/355.16; 74/674; 123/140, 376

(56) References Cited

U.S. PATENT DOCUMENTS

| | | | | |
|---|---|---|---|---|
| 3,613,651 A | * 10/1971 | Wilkinson | 74/674 |
| 3,972,478 A | * 8/1976 | Groelz | 239/189 |
| 4,580,402 A | * 4/1986 | Firey | 60/711 |
| 4,790,278 A | * 12/1988 | Schlosser et al. | 123/376 |
| 5,351,529 A | * 10/1994 | Locke, Sr. | 73/118.1 |
| 6,202,629 B1 | * 3/2001 | Zhu et al. | 123/339.21 |

FOREIGN PATENT DOCUMENTS

| | | |
|---|---|---|
| JP | 2000-38934 | 2/2000 |

* cited by examiner

*Primary Examiner*—Benjamin R. Fuller
*Assistant Examiner*—Jewel V. Thompson
(74) *Attorney, Agent, or Firm*—Sterne, Kessler, Goldstein & Fox P.L.L.C.

(57) ABSTRACT

A governor comprising an output setting means for setting an output value for an engine, an output adjusting means for adjusting an engine output based on a value set by the output setting means, and a load detecting means. The load detecting means is provided in a transmission system for driving a vehicle for detecting an amount of load torque generated through rotational resistance applied on the axles that is transmitted from the axles to the engine through the transmission system. The governor is a load detecting type governor in which the engine output is controlled to increase in response to the generated load torque detected by the load detecting means by displacing a position of the output adjusting means, as defined by the output setting means, to an output increasing side in accordance with a detected value of load torque and to maintain the engine output in the position, as defined by the output setting means, even upon detection of load torque by the load detecting means when the set value of the output setting means is an initial value or in a specified low output set region including the initial value. Further, the governor operates to increase a response speed of the output adjusting means with respect to load detection of the load detecting means as the set value of the output setting means increases beyond the initial value or the specified low output set region including the initial value.

9 Claims, 24 Drawing Sheets

GOVERNOR CONTROLLED ON A BASIS OF LOAD DETECTION

BACKGROUND OF THE INVENTION

1. Field of the Invention

The present invention relates to an arrangement of a governor for controlling, in a transmission system extending from an engine of a vehicle to axles thereof, engine outputs in response to load torque generated through rotational resistance applied on running wheels.

2. Related Art

Rotational resistance applied on wheels of a running vehicle is reversibly transmitted through a transmission system extending from an engine to axles as torque acting to rotate an engine output shaft in a direction opposite to its rotational direction of driving (hereinafter referred to as "load torque"). This torque comes to load during driving the engine. A generally used means for controlling the engine output in correspondence with this load (that is, increasing the output in accordance with the amount of load) is an electronic governor for calculating the amount of load upon detection through an engine output revolution speed sensor or similar and performing control based on the calculated value. Japanese Patent Unexamined Publication No. 38934/2000 discloses an arrangement of a governor being more advantaged in view of costs wherein a mechanical load detecting means (sensor) is provided at some midpoint of a transmission system for detecting load torque generated in the transmission system when rotational resistance is applied on wheels of a vehicle.

SUMMARY OF THE INVENTION

It is an object of the present invention to provide a mechanical governor of load detecting type arranged in that it utilizes a mechanical load detecting means, which is provided at some midpoint of a transmission system extending from an engine to wheels, that is linked to an output adjusting means of the engine (e.g. throttle of a carburetor of a gasoline engine or a control rack/control sleeve that functions as a means for adjusting a plunger lead position of a fuel injecting pump of a diesel engine) through an appropriate link mechanism.

In arranging such a governor, the link mechanism of the present invention between the load detecting means and the output adjusting means is comprised by way of a link connecting between an engine output setting means such as an accelerator pedal and the output adjusting means. More particularly, the governor of the present invention is generally comprised of a system wherein the output adjusting means is displaced based on a set output value as set by the output setting means, and wherein the load detecting means, which position is defined by the set value of the output setting means, is further displaced to an output increasing side upon detection of load torque by the load detecting means.

The governor of the present invention is further arranged in that the output adjusting means is not operated to the output increasing side even upon detection of increase of load torque by the load detecting means when the output setting means is in a range from an initial position to a specified low output set region. With this arrangement, in case the operator eases operating force applied to the output setting means with the aim of ceasing accelerating operations or braking and returns the output setting means to its initial position or the specified low output set region, the output of the engine will be decreased as intended by the operator even though the load detecting means will detect increase in load torque when rotational resistance is applied on the wheels through braking.

The governor of the present invention is further arranged in that a response speed of the output adjusting means with respect to load detection of the load detecting means is increased with increases in set value as set by the output setting means beyond the low output set region, and control of increases in output is suitably performed in correspondence to load detection in both, low speed running and high speed running conditions.

For achieving the above actions, the governor of the present invention is comprised of a movable member being displaceable on a basis of a set value as set by the output setting means and being linked to the output adjusting means, the movable member being further connected to the load detecting means, wherein a position of the movable member defined by the set value set by the output setting means is further displaced upon detection of load torque by the load detecting means for further displacing the output setting means to an output increasing side. In this arrangement, the linkage between the load detecting means and the movable member is arranged with play such that the movable member will not be displaced even upon detection of load torque by the load detecting means when the output setting means is in the low output set region.

This play is further set to be decreased and finally vanished in accordance with increases of the set value set by the output setting means beyond the low output set region.

For achieving compactness and protection of the governor arrangement of the present invention, the movable member may be incorporated in a housing incorporating therein the transmission system.

The governor of the present invention is further arranged in that positional adjustment of the output adjusting means is performed by additionally accommodating a detected value of a revolution speed detecting means for detecting an engine output revolution speed, thereby eliminating excess increases in output revolution speed of the engine.

More particularly, the revolution speed detecting means for detecting an output revolution speed of the engine is comprised with a first movable member that is displaced in accordance with revolution speed detection. The first movable member is linked to the output adjusting means such that the output adjusting means is displaced to an output decreasing side accompanying increases in detected value of the revolution speed detecting means.

On the other hand, the above-described movable member, which is arranged to be displaced in one direction with increases in the set value set by the output setting means and which position as defined by the set value of the output setting means is further displaced in the one direction when load torque is detected by the load detecting means, is defined to be a second movable member. The first movable member and the second movable member are linked such that a displacement direction of the second movable member accompanying increases in the set value of the output setting means and the detected value of the load detecting means and the displacement direction of the first movable member accompanying increases in the detected value of the revolution speed detecting means are mutually opposite, wherein the first movable member is displaced upon displacement of the second movable member by an amount decrement by a displacement amount on a basis of detection of the revolution speed detecting means, and wherein positional control of the output adjusting means is performed based on the displacement of the second movable member.

An elastic member may be interposed between the first movable member and the second movable member to prevent damages on the first movable member through forcible pulling by the second movable member.

A play with similar actions as the above-described ones is provided also in this arrangement between the second movable member and the load detecting means.

The above and further objects, features and effects of the present invention will become more relevant from the following detailed explanations based on the accompanying drawings.

DETAILED DESCRIPTION OF THE PREFERRED EMBODIMENTS

Figure 1:
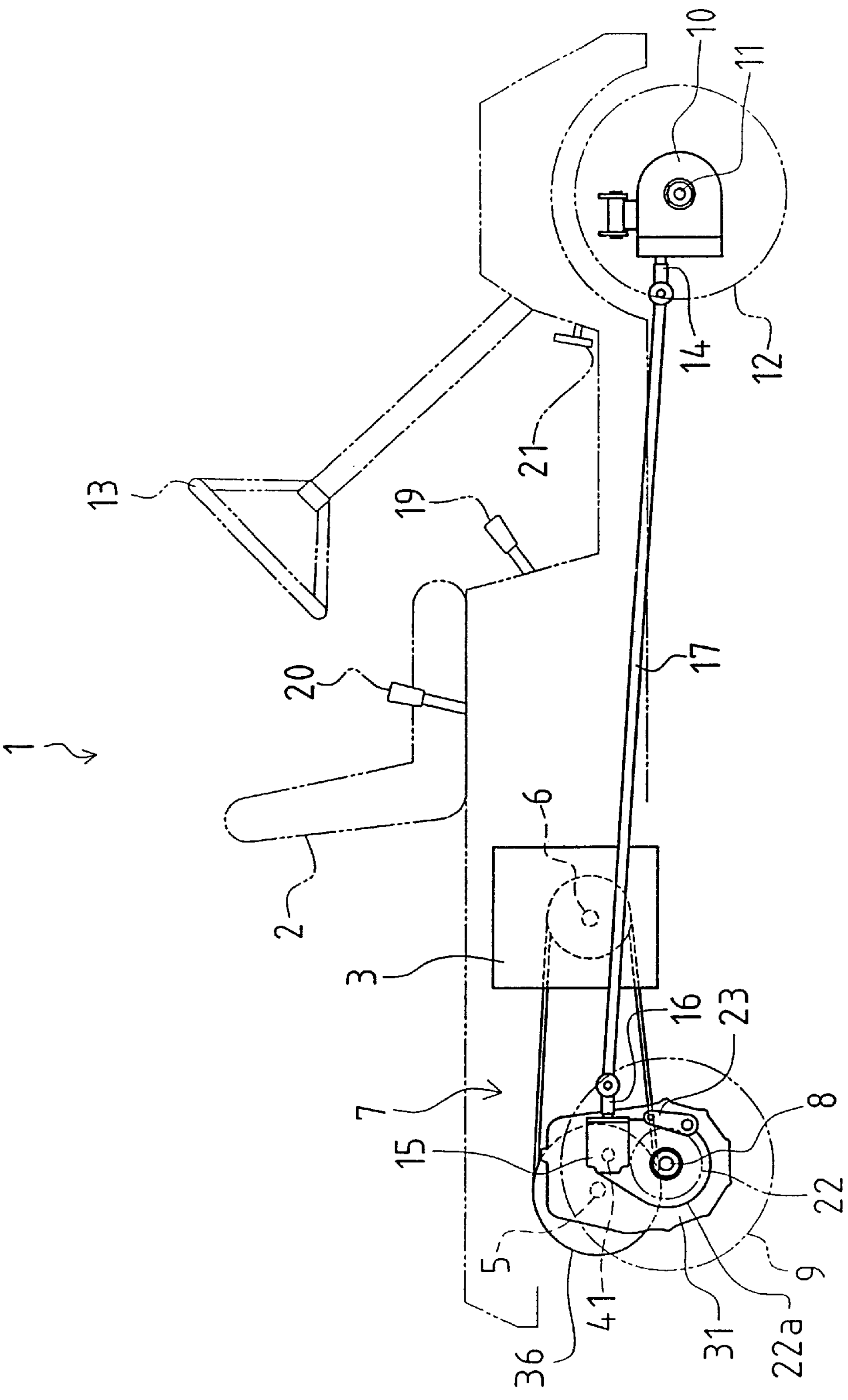
FIG. 1 is an overall side view of a transportation vehicle as one embodiment of a vehicle equipped with an engine to which the governor of the present invention is applied.

The governor of the present invention is, for instance, applied to a transportation vehicle 1 as illustrated in FIG. 1. This transportation vehicle 1 is provided, on a rear lower side of an operator seat 2, with an engine 3 and a transmission case 31 incorporating therein a transmission 4 of staged mechanical type as it will be described later (while the transmission of this embodiment is of gear type, it may also be of hydraulic clutch type or alternative types). A pair of driving axles (rear axles) 8 extending in lateral directions are supported by the transmission case 31 and rear wheels 9 are attached to outer ends of the respective rear axles 8. It is preferable that a non-stage and automatic transmissible type CVT be provided at some point between an output shaft 6 of the engine 3 and an input shaft 5 of the staged transmission 4 projecting from the transmission case 31, and while the present embodiment employs a belt-type CVT 7, it may also be replaced, for instance, by a hydrostatic-type CVT utilizing a hydraulic pump/motor. In this manner, it is possible to arrange a transmission system extending from the engine 3 to the rear axles 8 that is comprised of the CVT (belt-type CVT 7) and the staged transmission (transmission 4) in this order.

A front axle case 10 is supported frontward of the vehicle body containing therein a pair of right and left front axles 11 or a differential device for differential linkage of both front axles 11. Front wheels 12 are attached to outer ends of respective front axles 11 and project in lateral directions from the front axle case 10. The front axle case 10 is pivotally supported on a vehicle frame by a kingpin to be substantially located centrally in the lateral direction and to be freely oscillating in the lateral direction, and is thus operated to oscillate through steering of a steering wheel 13.

The front axle case 10 is provided with an input shaft 14 projecting rearward thereof. A front wheel power retrieving case 15 incorporating therein a front wheel driving PTO unit for retrieving driving force from the transmission 4 within the transmission case 31 is mounted to one lateral side of the transmission case 31. A front wheel driving shaft 16 is provided to project frontward of the front wheel power retrieving case 15. The front wheel driving shaft 16 and the input shaft 14 are connected through a transmission shaft 17 and an universal joint.

A clutch 18 for connecting and disconnecting driving force to the front wheel driving shaft 16 is provided within the front wheel power retrieving case 15. This clutch 18 is linked to a driving mode switching operating means such as a lever (not shown) wherein the driving modes of the vehicle may be switched between a two-wheel driving mode, when disconnecting the clutch 18 through the operating means, and a four-wheel driving mode, when the clutch is connected.

A differential locking lever 19 for locking the differential device is disposed in a front downward direction of the operator seat 2, and a transmission lever 20 for switching operations of speed ranges of the transmission 4 within the transmission case 31 is disposed laterally of the operator seat 2.

An accelerator pedal 21 is disposed frontward of the operator seat as an engine output setting means of the present embodiment. The accelerator pedal 21 is linked to a throttle lever 131 (illustrated in FIG. 5) for adjusting the openness of a throttle valve 130 of a carburetor of the engine 3. The throttle valve 130 functions as an engine output adjusting means in the present embodiment. The throttle lever 131 is further linked to the load sensor 34 within the transmission case 31 so that the throttle lever 131 is rotationally adjusted in accordance with an amount of depression of the accelerator pedal 21 and the amount of load torque detected by the load sensor 34 that is transmitted to the transmission 4.

Brake cases 22*a* are mounted to both lateral sides of the transmission case 31 with brakes 22 being provided within the respective brake cases 22*a* for braking respective rear axles 8. Brake control levers 23 for operating brakes 22 are pivotally supported in each of the brake cases 22*a*, and both brake control levers 23 are linked to a single brake pedal (omitted in the drawings) disposed proximate to the accelerator pedal 21. By depressing the brake pedal, right and left rear axles 8, 8 are simultaneously braked.

The governor of the present invention is further arranged in that its load detecting means (load sensor 34) is provided at some midpoint of the transmission 4 within the transmission case 31. When a conventional centrifugal governor of engine revolution speed detecting type is used, the engine output revolution speed needs to be detected upward of the clutch between the engine output shaft and the transmission system (which corresponds to the belt-type CVT 7 in the present embodiment), and the governor is disposed in a manner as to be mounted to the engine, thereby increasing the overall volume of the engine. In contrast thereto, since the load detecting means (load sensor 34) of the governor of the present invention is disposed at some midpoint of the transmission 4 within the transmission case 31, it is possible to make the engine 3 and the periphery thereof compact in size.

When driving resistance is applied on the rear wheels 9 (and also on the front wheels 12 in case of four-wheel driving), load torque (to be described later) transmitted into the transmission 4 is detected by the load sensor 34 for governor-controlling the engine, while the belt-type CVT 7 is simultaneously adjusted in an automatic manner, and a revolution ratio of the input shaft 5 of the transmission 4 with respect to the output shaft 6 of the engine 3 is varied. In this manner, the engine output and transmission ratio are adjusted to be optimized values for load applied on the rear wheels 9 and other members as driving resistance, and the transporting vehicle 1 continues to run in a constant and stable manner.

Figure 2:
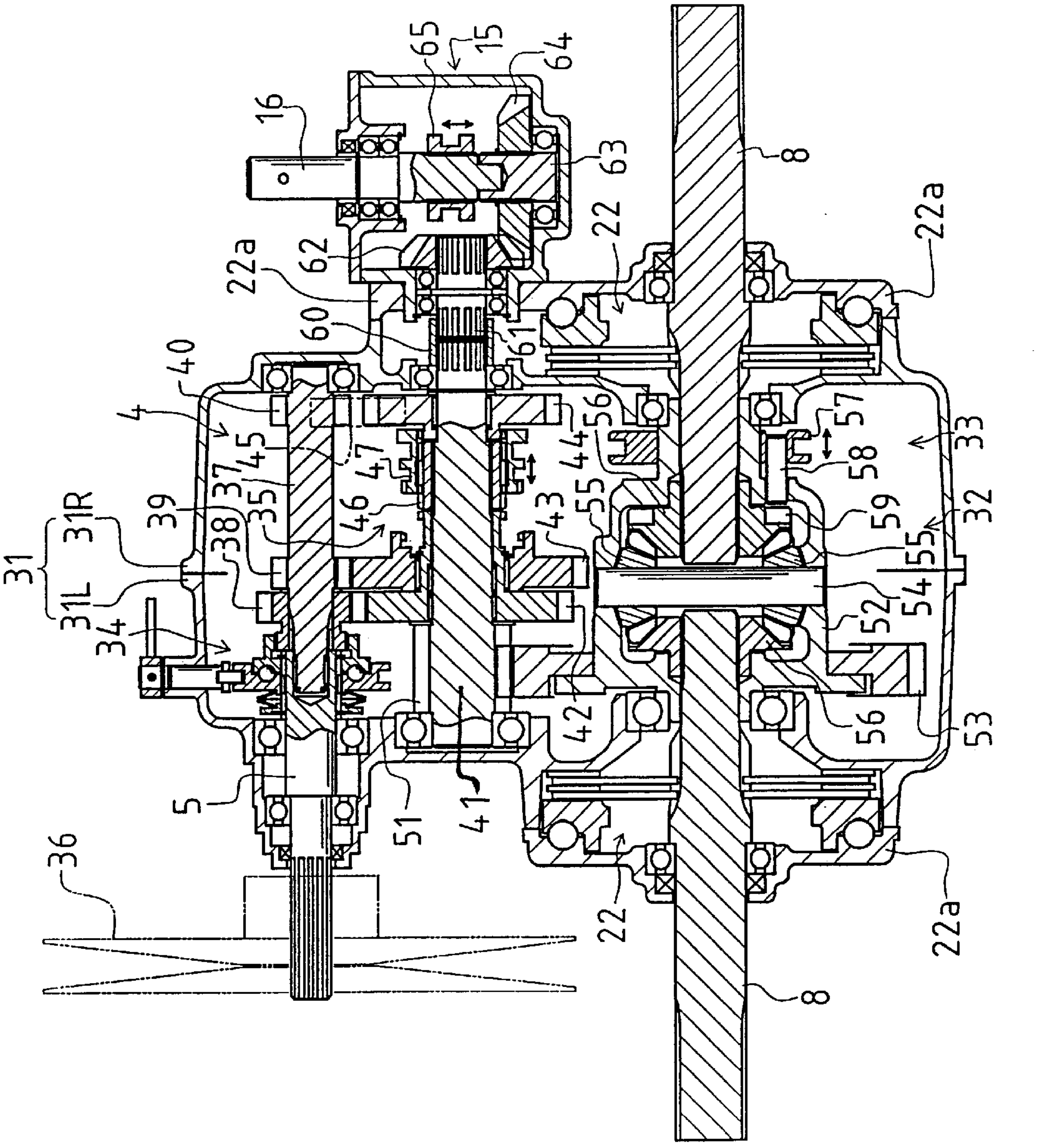
FIG. 2 is a rear sectional exploded view of a transmission case 31 incorporating therein a load sensor (load detecting means) 34 utilized in the governor of the present invention that is applied to the transportation vehicle as illustrated in FIG. 1.

The arrangement of the transmission case 31 and the transmission 4, including the load sensor 34 therein, as applied to the transporting vehicle 1 of FIG. 1 will now be discussed with reference to FIG. 2 and others.

The transmission case 31 is arranged by connecting a leftward case half portion 31L and a rightward case half portion 31R at vertical and flat peripheral joint surfaces thereof. The above-described input shaft 5 is transversely supported to extend in a lateral direction within the transmission case 31 with one end of the input shaft 5 projecting outward from one lateral surface of the transmission case 31. A follower pulley 36 is provided to surround an end portion of the projecting portion of the input shaft 5 as a split pulley structure such that the follower pulley 36 comprises an output side of the above-described belt-type CVT 7.

As it is known in the art, the belt-type CVT 7 is shifted in a non-staged manner such that deceleration ratios automatically become smaller accompanying increases in the revolution speed of the engine 3. It should be noted, however, that the invention is not limited to the belt-type CVT as in the present embodiment as long as the CVT performs automatic transmission in a non-staged manner, and it may be replaced, for instance, by a hydrostatic-type CVT employing a hydraulic pump/motor.

A first transmission shaft 37 is disposed in the transmission case 31 as to be aligned to be coaxial with the input shaft 5, wherein the first transmission shaft 37 and the input shaft 5 are combined via the load sensor 34. A more particular description of the load sensor 34 appears below.

A second transmission shaft 41 is disposed in parallel with the first transmission shaft 37, and a gear-type transmission mechanism 35 is arranged between both transmission shafts 37, 41. More particularly, a low speed driving gear 39 and a backward running driving gear 40 are integrally formed with the first transmission shaft 37 and a high speed driving gear 38 is fixed to be incapable of relatively rotating. On the other hand, a high speed follower gear 42 and a backward running follower gear 44 are fitted with play to the second transmission shaft 41 to be capable of relatively rotating, and a low speed follower gear 43 is provided in a relatively rotating manner above a boss portion of the high speed follower gear 42. The high speed driving gear 38 and the high speed follower gear 42 as well as the low speed driving gear 39 and the low speed follower gear 43 are continuously in mesh with each other, and the backward running driving gear 40 is continuously in mesh with the backward running follower gear 44 via a reversing gear 45 provided in the transmission case 31 to be freely rotating with play.

A spline hub 46 is mounted onto the second transmission shaft 41 to be incapable of relatively rotating between the low speed follower gear 43 and the backward running follower gear 44, and a clutch slider 47 is mounted on the spline hub 46 to be incapable of relatively rotating and to be freely sliding in axial directions. The clutch slider 47 may be shifted, through sliding operations thereof, into either of a high speed forward running position in which it is engaged with the high speed follower gear 42, a low speed forward running position in which it is engaged with the low speed follower gear 43, a backward running position in which it is engaged with the backward running follower gear 44, and a neutral position in which it is engaged to none of the gears.

The clutch slider 47 is connected to a clutch fork shaft (not shown) arranged to be linearly movable, and the clutch fork shaft is linked to the transmission lever 20 laterally of the operator seat side via the link mechanism. Through manual operations of the transmission lever 20, the clutch slider 47 may be operated in a sliding manner to assume either the low speed forward running position, the high speed forward running position, the backward running position or the neutral position.

A transmission output gear 51 is formed at a portion of the second transmission shaft 41 closer to the one end thereof for transmitting revolutions of the second transmission shaft 41 to a differential gear device 32 for differential linkage of both axles 8.

The differential gear device 32 is of ordinary arrangement. More particularly, a differential case 52 being aligned to be coaxial with a rotation axis of the axles 8 is supported by the transmission case 31 in a freely rotating manner and a ring gear 53 is fixedly provided on an outer peripheral surface of the differential case 52 to be in mesh with the transmission output gear 51. Inner ends of the axles 8 with differential side gears 56 comprised by bevel gears being fixed thereto in a surrounding manner are disposed within the differential case 52. A pinion shaft 54 is further axially supported between the axles 8 in the differential case 52 as to be perpendicular to an axial center of the axles 8. A pair of pinions 55 comprised by bevel gears are formed on the pinion shaft 54 at symmetric positions with respect to the axles 8 so as to surround the shaft and to be capable of relative rotation. The pinions 55 are located between the differential side gears 56 of both axles 8 to be in mesh therewith.

The differential case 52 follows the rotation of the second transmission shaft 41 through the meshing of the gears 51, 53 and the pinion shaft 54 integrally rotating with the differential case 52. Both axles 8 are integrally rotated with the pinion shaft 54 through the pinions 55 and the differential side gears 56. When either of the axles 8 receives heavier load than the other, each pinion 55 is relatively rotated with respect to the pinion shaft 54 by a rotational difference between the differential side gears 56 to thereby permit differentiation of both axles 8.

A differential locking device 33 is provided within the transmission case 31 for locking the differential gear device 32. This locking device is comprised of the following members: a differential locking slider 57 provided at a boss portion, which is formed on a side opposite to the position at which the ring gear 53 of the differential case 52 is fixedly provided, to be freely sliding in axial directions; a locking pin 58 fixedly provided at the differential locking slider 57 with its tip end being inserted into the differential case 52; and an engaging concave portion 59 provided on a rear surface of one lateral differential side gear 56 for engaging the tip end of the locking pin 58 therein. When the locking pin 58 is engaged at the engaging concave portion 59 through sliding operation of the differential locking slider 57, the differential case 52 and the rear axles 8 are integrally connected to lock the differential gear device 32 and the right and left rear axles 8, 8 are accordingly driven at identical revolution speeds.

The differential locking slider 57 is connected to a differential shift fork (not shown) while the differential shift fork is linked to the differential locking lever 19 through an arm or a similar link mechanism (not shown) such that operations for locking and releasing the differential gear device 32 can be performed through tilting operations of the differential locking lever 19.

A frictional-type disk brake 22 is provided above each rear axle 8 wherein both disk brakes 22 are simultaneously actuated for braking by rotationally operating the brake control levers 23 as illustrated in FIG. 1 through the above-described brake pedal.

One end of the second transmission shaft 41 projects out from one lateral side of the transmission case 31 to be located within an extension of a brake case 22*a*, and a tip end of a front wheel transmission shaft 61 connected thereto via a coupling 60 is made to project outward from a surface of the extension of the braking case 22*a*. The front wheel transmission shaft 61 is inserted into the above-described front wheel power retrieving case 15, which is formed on the surface of the extension of the brake case 22*a* in a concave manner, and a bevel gear 62 is fixed to the tip end of the front wheel transmission shaft 61. A front wheel clutch shaft 63 is supported in front and rear directions within the front wheel power retrieving case 15, and a bevel gear 64 is fixedly provided at the front wheel clutch shaft 63 wherein the bevel gear 64 is in mesh with the bevel gear 62 formed on the front wheel transmission shaft 61.

The above-described front wheel driving shaft 16 is further disposed within the front wheel power retrieving case 15, aligned to be coaxial with the front wheel clutch shaft 63. The front wheel driving shaft 16 is provided to be relatively rotating with respect to the front wheel clutch shaft 63. A front wheel clutch slider 65 is fitted onto the front wheel driving shaft 16 to be incapable of relatively rotating but freely slidable in axial directions, wherein the clutch slider 65 engages with a spline formed in the front wheel clutch shaft 63 through sliding operation thereof for transmitting the rotation of the front wheel clutch shaft 63 to the front wheel driving shaft 16. The clutch slider 65 is linked to the above-described driving mode switching operating means via a link mechanism (not shown), and through operation of the driving mode switching operating means, output to both front wheels 12 is connected or disconnected for enabling switching between two-wheel driving, using only the rear wheels 9, or four-wheel driving, using front and rear wheels 9, 12.

In arranging the mechanical governor based on load detection according to the present invention, a particular arrangement of the load sensor 34 (a governor controlling sensor interposed between the input shaft 5 and the first transmission shaft 37 within the transmission case 31) will now be explained with reference to FIGS. 3 and 4.

Figure 3:
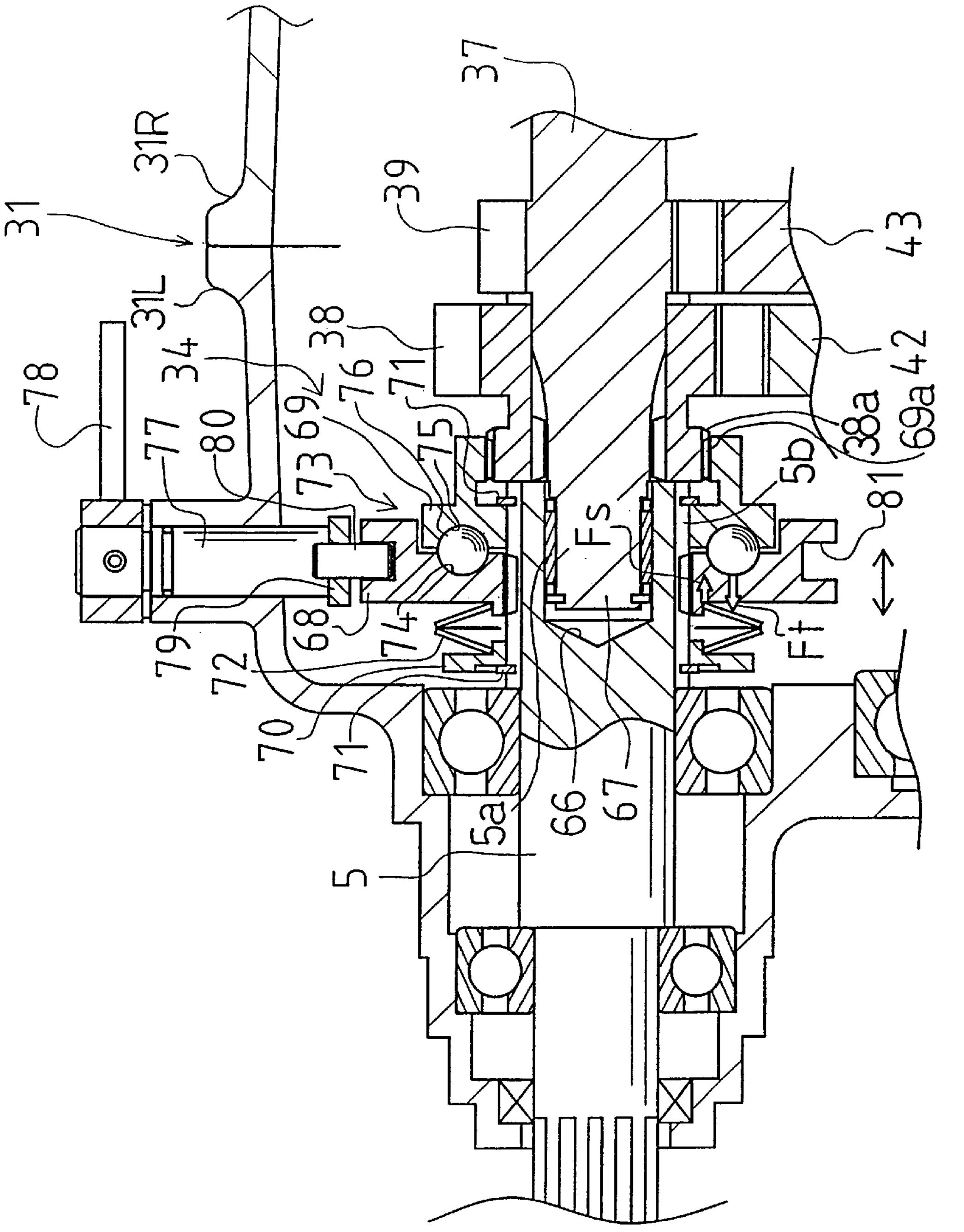
FIG. 3 is a rear sectional enlarged view of the load sensor 34 disposed within the transmission case 31 as illustrated in FIG. 2.

As illustrated in FIG. 3, an insert hole 5*a* extending in the axial central direction is provided at an end portion of the input shaft 5 within the transmission case 31. The first transmission shaft 37 is disposed to be coaxial with the input shaft 5 and is provided with a protrusion 67. The protrusion 67 is inserted into the insert hole 5*a* via a needle bearing 66. In this manner, the first transmission shaft 37 is arranged to be relatively rotating with respect to the input shaft 5. Thus, when load is applied on the axles 8 and this load is transmitted to the first transmission shaft 37, a rotational phase lag of the first transmission shaft 37 with respect to the input shaft 5, which substantially performs synchronous rotation with the output shaft 6 of the engine 3, is permitted.

A spline 5*b* is formed on an outer peripheral surface of the input shaft 5 proximate to a position at which the first transmission shaft 37 is being supported, and by spline fitting a disk-like sliding member 68 onto the spline 5*b*, the sliding member 68 is provided on the input shaft 5 to be incapable of relatively rotating but to be freely slidable in axial directions. A stop plate 70 is aligned on the spline 5*b* frontward of the sliding member 68 and a disk-like load responding member 69 rearward of the sliding member 68. The load responding member 69 and the stop plate 70 are not engaged with the spline 5*b* on the input shaft 5 but are arranged to be relatively rotating with respect to the input shaft 5. However, the stop plate 70 is prevented from frontward movements on the input shaft 5 and the load responding member 69 from rearward movements through respective pairs of stop rings 71 engaged at the spline 5*b*.

A sub-gear 38*a* is formed at a front end of a boss portion of the high speed driving gear 38 fixedly provided on the first transmission shaft 37 and is disposed immediately behind the input shaft 5, and an internal gear 69*a* formed at a rear end of the load responding member 69 meshes with the sub-gear 38*a* to thereby make the load responding member 69 rotate integrally with the first transmission shaft 37.

A pair of Belleville springs 72 are interposed between the sliding member 68 and the stop plate 70 to be opposing each other in an abutting manner, whereby the sliding member 68 is continuously urged to the load responding member 69 side.

A cam mechanism 73 is further provided between the sliding member 68 and the load responding member 69. More particularly, a plurality of semispherical concave portions 74 are formed on the sliding member 68 on a same periphery at equal intervals, while cam grooves 75 are formed on the load responding member 69 to suit respective positions of the concave portions 74. Each cam groove 75 as illustrated in FIG. 4 is formed to be an arc-like groove with a central axis of the load responding member 69 being a center thereof. Start end portions of the cam grooves 75 are formed as semispherical detent portions 75*a*, which are of a diameter substantially identical to that of the concave portions 74, along a rotating direction (direction indicated by the hollow arrow in FIG. 4) when the load responding member 69 is rotated with the transmission input shaft 5 and the first transmission shaft 37. After passing the detent portions 75*a*, thrust portions 75*b* are formed that become shallower in approaching terminal ends of the cam grooves 75. Steel balls 76 are further pinched and held between the respective cam grooves 75 and concave portions 74.

It should be noted that the cam mechanism 73 might be replaced by a face cam with opposing surfaces of the sliding member 68 and load responding member 69 being formed to be wave-like.

Figure 4:
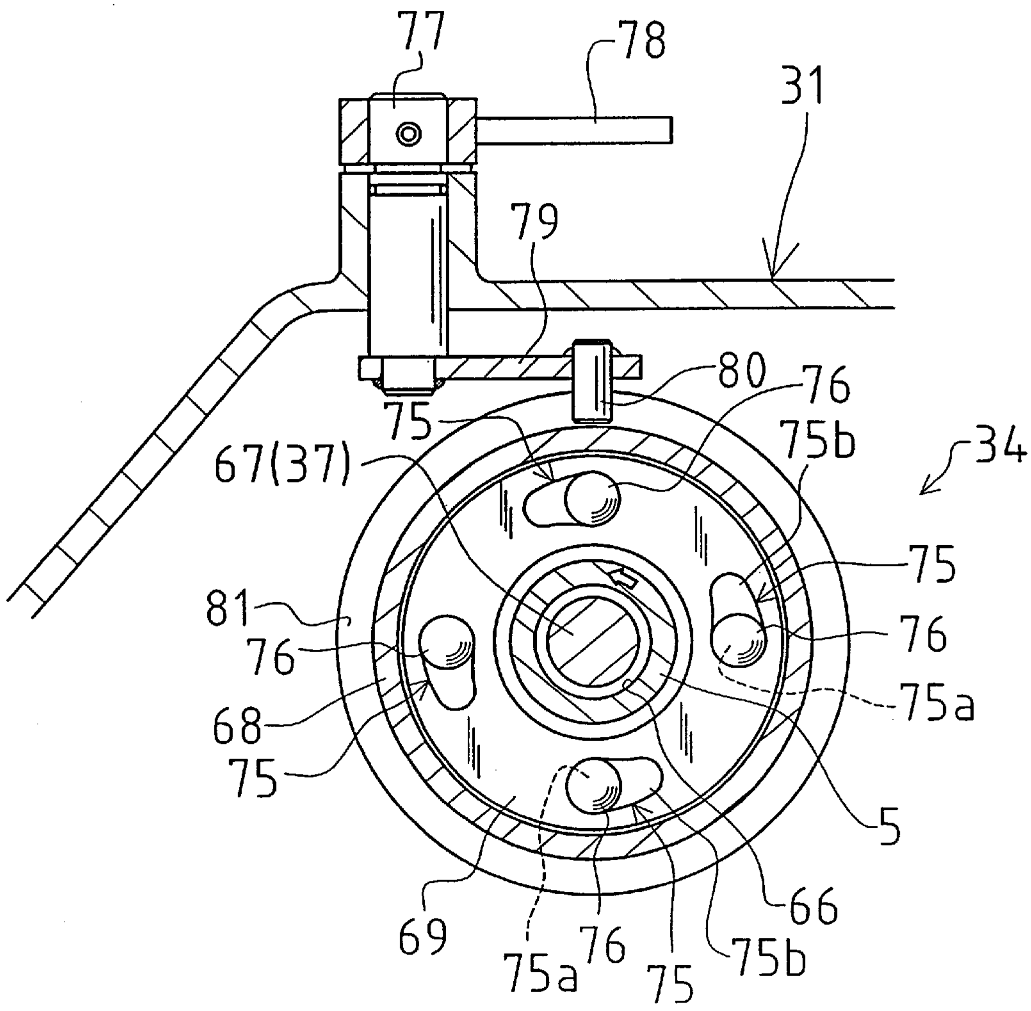
FIG. 4 is a side sectional view of the load sensor 34 as illustrated in FIG.2.

In such an arrangement, the transmission input shaft 5 that is interlocked and connected to the engine output shaft 6 of the engine 3 is rotated in the direction as shown by the arrow in FIG. 4, and the sliding member 68 engaged with the input shaft 5 is integrally rotated. Accompanying this rotation, urging force Fs with which the Belleville springs 72 urge the sliding member 68 into the load responding member 69 is transmitted through the steel balls 76 of the cam mechanism 73 to the load responding member 69 as torque for rotating the load responding member 69 to follow the sliding member 68. The load responding member 69 is accordingly rotated integrally with the sliding member 68, that is, the first transmission shaft 37 integrally rotates with the input shaft 5 whereupon the rotating force is transmitted over the gear-type transmission mechanism 35 and the differential gear device 32 to the rear axles 8 (or the rear axles 8 and the front axles 11).

Various kinds of resistances are generated on the front wheels 12 or rear wheels 9 during running. Just to list a few, such resistances are represented by rolling resistance caused by deformations in the wheels 9, 12 or ground surfaces, shock resistance, air resistance, acceleration resistance or gradient resistance, wherein such resistances are transmitted to the first transmission shaft 37 and the load responding member 69 via the gear-type transmission mechanism 35 as torque directed against driving the wheels 9, 12 (axles 8, 11).

When the operator applies braking actions onto the rear axles 8 by actuating the above-described brakes 22, such braking actions are similarly transmitted to the first transmission shaft 37 and the load responding member 69 via the gear-type transmission mechanism 35 as torque directed against driving the rear axles 8.

Such torque, that is, torque generated in a direction against a driving direction of the axles 8, 11 is defined to be a "load torque" in the present invention. This load torque is applied onto the load responding member 69 as torque generating a rotational phase lag with respect to the sliding member 68. When the load torque is weak, rotation is performed through torque applied onto the sliding member 68 through engine driving force with rear halves of the steel balls 76 being fitted into the detent portions 75*a* of the cam grooves 75 in the load responding member 69. On the other hand, when the load torque applied onto the load responding member 69 becomes larger to exceed a specified value, the steel balls 76 receiving this torque are moved within the cam grooves 75 from the detent portions 75*a* to the thrust portions 75*b* such that the rotational phase of the sliding member 68 is actually delayed from that of the load responding member 69. Thrust Ft (FIG. 3) is generated at the steel balls 76 that are positioned on the thrust portions 75*b* for pressing the sliding member 68 to the stop plate 70 against the urging force of the Belleville springs 72.

While the thrust Ft becomes larger the greater the load torque becomes, the force of the Belleville springs Fs for pushing the sliding member 68 back to the load responding member 69 side becomes larger the more the sliding member 68 approaches the stop plate 70 side. Accordingly, the sliding member 68 is displaced up to an equilibrium position in which amounts of both forces Ft and Fs become equal, and the amount of displacement of the sliding member 68 is uniquely defined by the amount of load torque.

In this manner, the load sensor 34 is arranged to displace the sliding member 68 along an axial central direction of the input shaft 5 in accordance with the amount of load torque generated in the transmission system through resistance applied on the wheels 9, 12.

For enabling retrieving of the displacement amount of the sliding member 68 as a detection signal for controlling the governor, a sensing shaft 77 is supported at an upper wall of the transmission case 31 at a position proximate to the sliding member 68 to be freely rotating around an axial center thereof. A base end of a second sensor output arm 78 extending perpendicular with respect to the axial center of the sensing shaft 77 is fixedly formed on an end portion of the sensing shaft 77 outside of the transmission case 31.

A base end of a sensing arm 79 extending in a horizontal direction is fixedly formed on an end portion of the sensing shaft 77 inside of the transmission case 31, and a protrusion 80 is provided at the tip end of the sensing arm 79 in a projecting manner. An annular groove 81 is notched onto an outer peripheral surface of the sliding member 68, wherein the protrusion 80 at the tip end of the sensing arm 79 is engaged with this annular groove 81.

In the above arrangement, when load torque is detected and the sliding member 68 is displaced in an axial central direction, the sensing arm 79 is oscillated in accordance with the displacement amount and the sensing shaft 77 is integrally rotated therewith such that the sensor output arm 78 outside of the transmission case 31 is accordingly oscillated integrally therewith. In this manner, a linear directional displacement of the sliding member 68 is converted into an oscillating angle of the second sensor output arm 78 outside of the transmission case 31 and is transmitted as a governor controlling signal to the output adjusting means of the engine (in this embodiment, the throttle of the carburetor) via the link mechanism.

Particular embodiments of the link mechanism that is interposed between the accelerator pedal 21 serving as the output setting means for the engine, the load sensor 34 serving as the load detecting means, and the throttle valve 130 (throttle lever 131) serving as the output adjusting means for the engine as well as actions of a governor that is arranged by employing this link mechanism will now be explained with reference to FIGS. 5 to 24.

It should be noted that the following explanations refer to positions or moving directions of each of the parts with reference to the drawings, wherein such positions or directions may be suitably varied when actually disposing these respective parts within a vehicle.

The accelerator pedal 21 is just an example of the output setting means for the engine and may be replaced, for instance, by a manual lever or similar. Similarly, the throttle valve 130 is just an example of the output adjusting means for the engine, and it is possible to replace the throttle valve with, for instance, a control rack/control sleeve that is linked to a plunger of a fuel injecting pump when employing a diesel engine.

Figure 5:
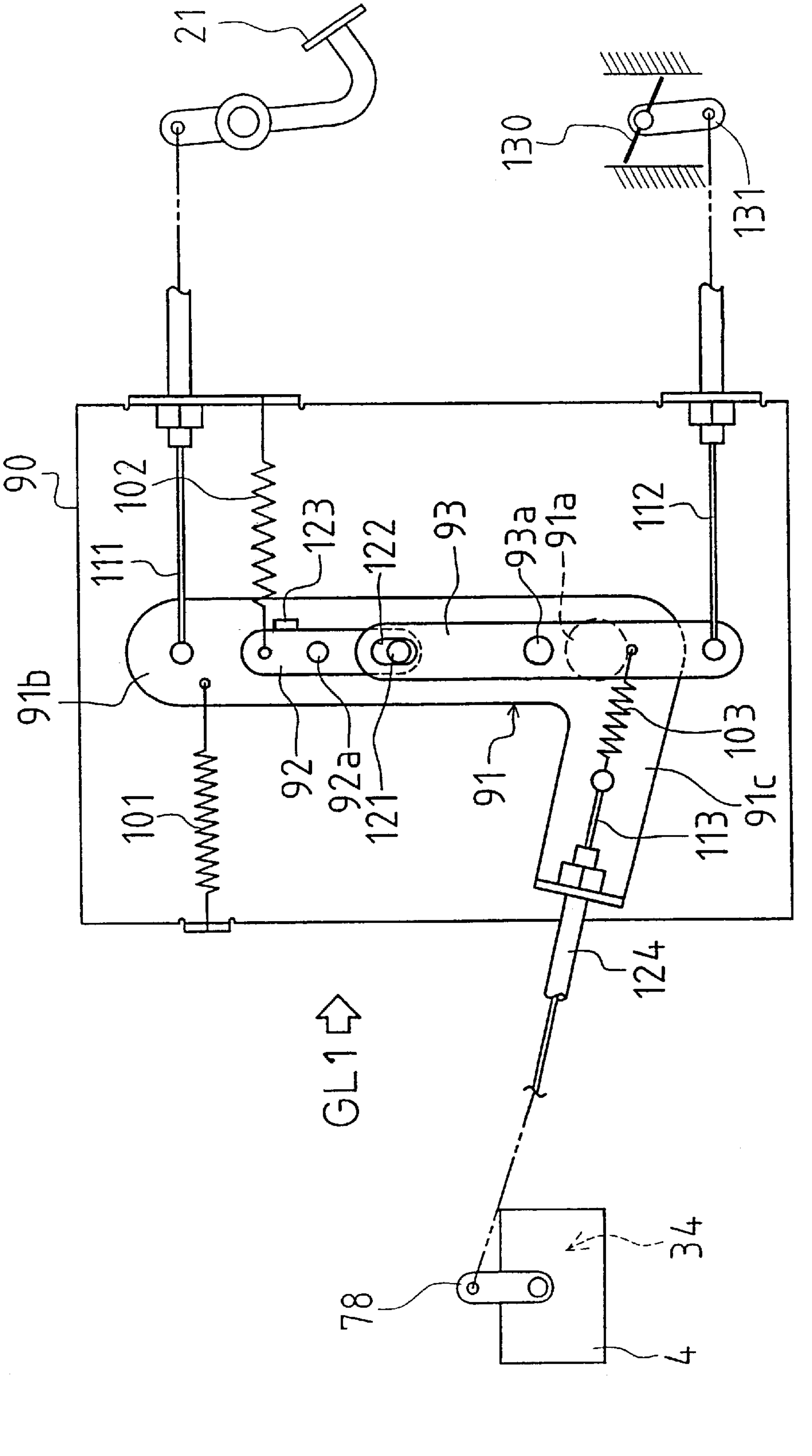
FIG. 5 is a systematic view of a first embodiment of the load detecting type governor of the present invention including a structural view of a governor link mechanism GL1 in an initial condition.
Figure 14:
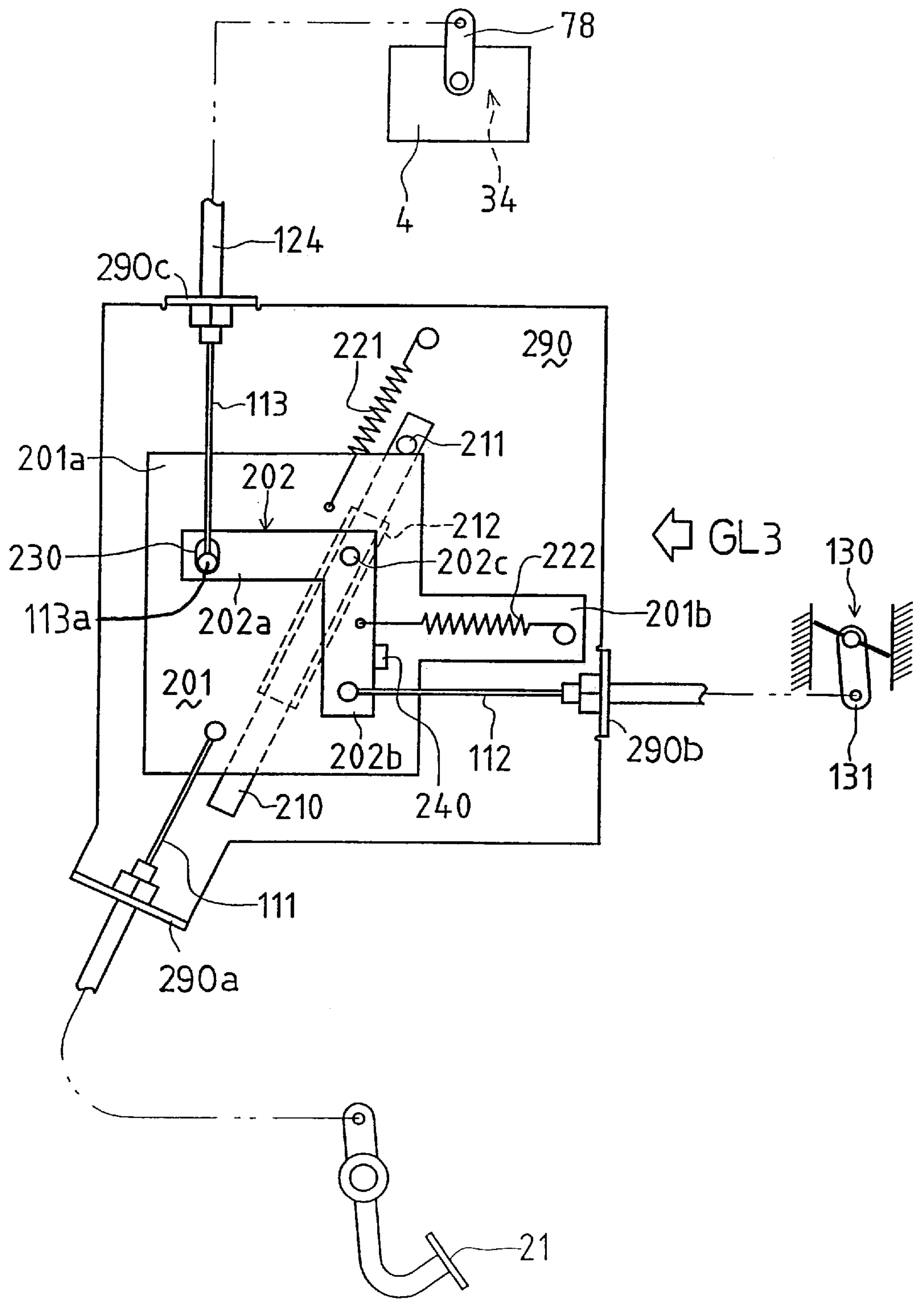
FIG. 14 is a systematic view of a third embodiment of the load detecting type governor of the present invention including a structural view of a governor link mechanism GL3 in an initial condition.
Figure 15:
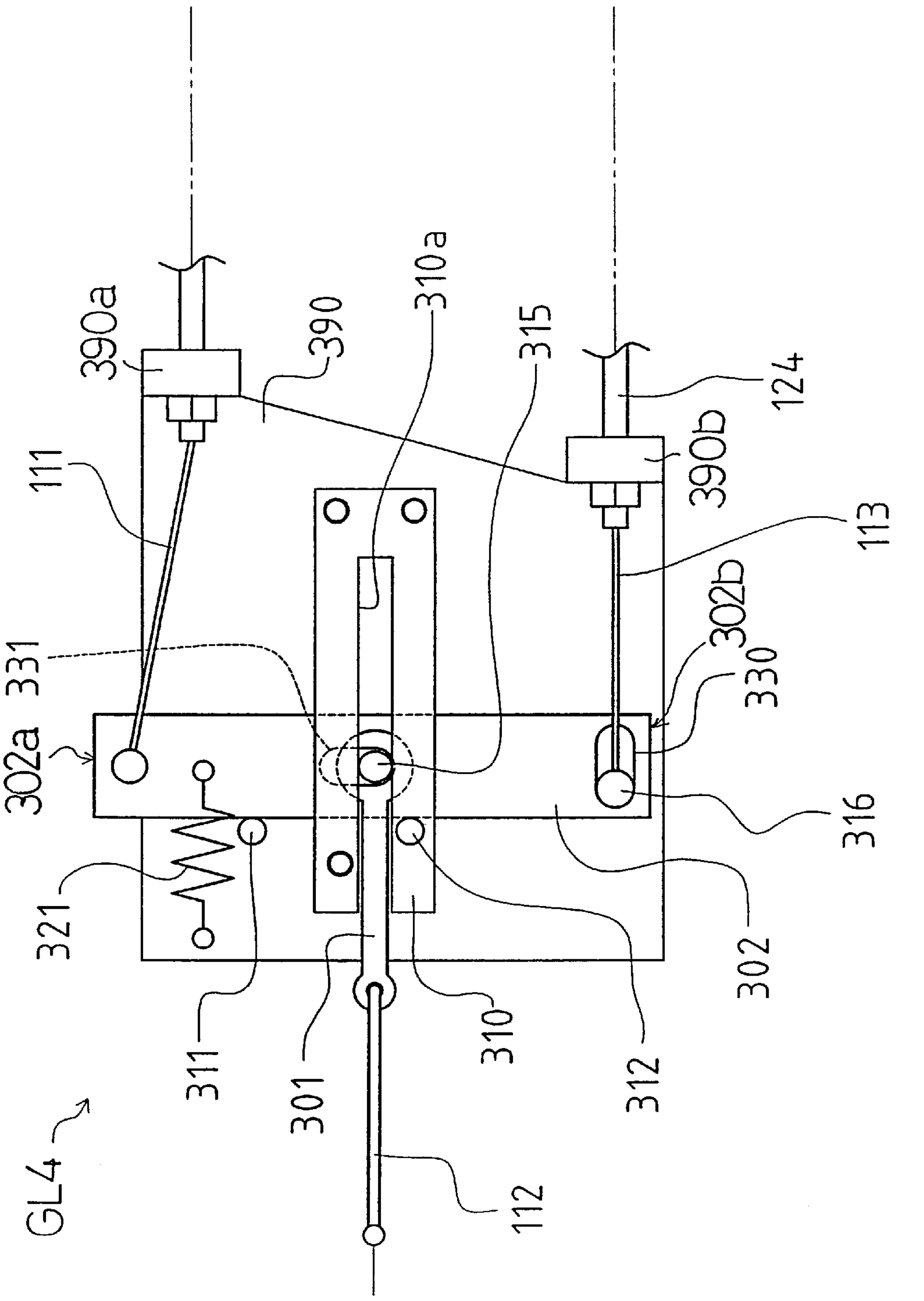
FIG. 15 is a structural view of a governor link mechanism GL4 employed in a fourth embodiment of the load detecting type governor of the present invention.
Figure 22:
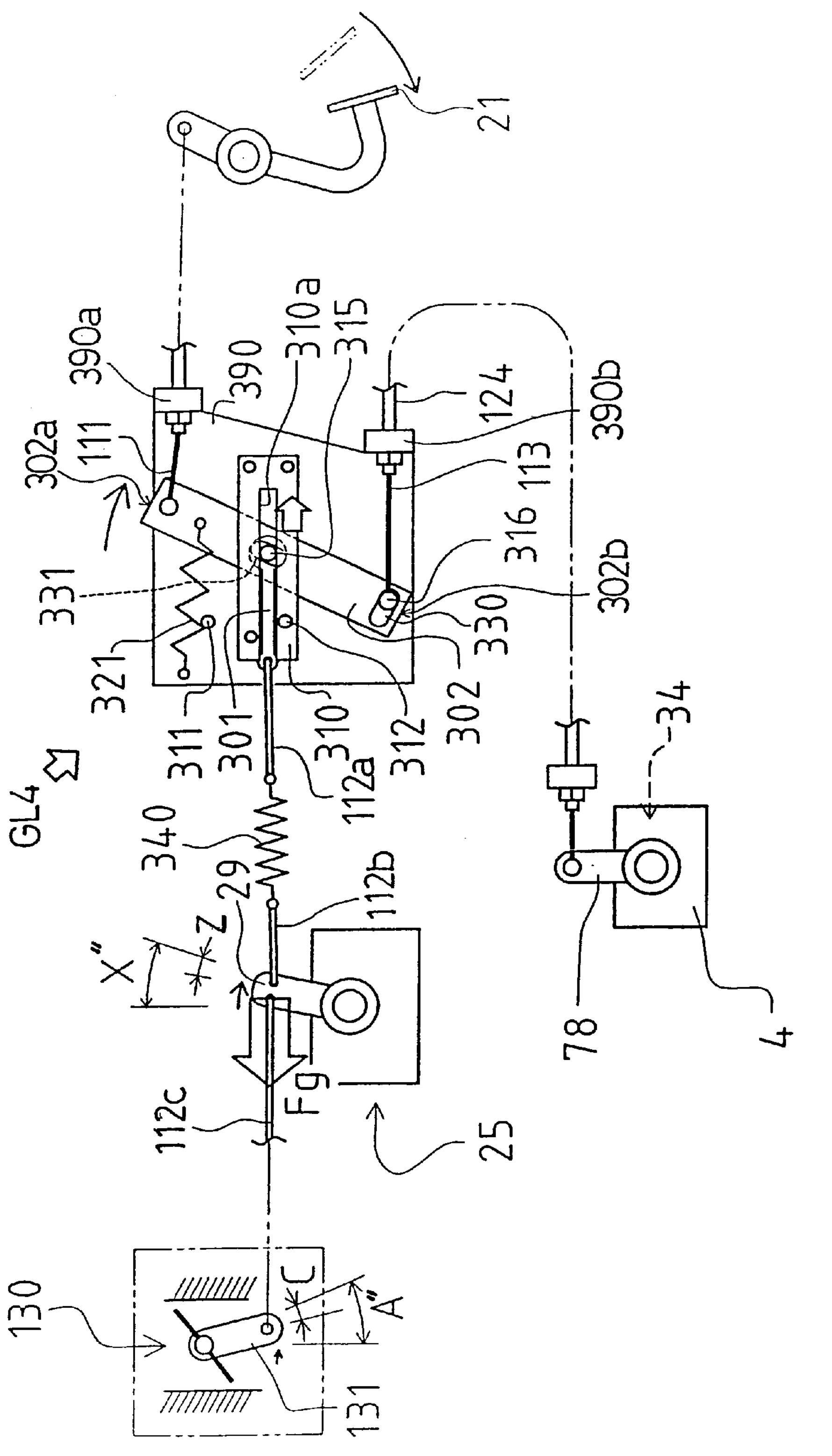
FIG. 22 is a similar view wherein the accelerator pedal 21 is depressed in a substantially full stroke, and increases in revolution speed of the engine output shaft is detected by the revolution speed sensor 25.

The arrangement of a governor link mechanism GL1 as illustrated in FIG. 5 will now be explained. A pivot pin 91*a* is installed on an upper surface of a base 90 and a periphery of a bending portion of a bending arm 91 of substantially L-shape is pivotally supported on the pivot pin 91*a* in a freely rotating manner. (The base 90 is mounted on a suitable portion of the vehicle such as on the vehicle frame or the transmission case 31. The same applies for base 290 of a governor link mechanism GL3 as illustrated in FIG. 14 as will be explained later, base 390 of a governor link mechanism GL4 as illustrated in FIG. 15 and others, and base 490 of a governor link mechanism GL5 as illustrated in FIG. 22 and others.) The bending arm 91 is comprised of a first arm portion 91*b* and a second arm portion 91*c* substantially intersecting at a position proximate to the position of the pivot pin 91*a*.

A wire 111 extending from the accelerator pedal 21 is guided to a part of the base 90 and is connected to the first arm portion 91*b*. With this arrangement, the bending arm 91 is oscillated clockwise in FIG. 5 in accordance with the amount of depressing the accelerator pedal 21.

A first spring 101 is interposed between the first arm portion 91*b* and the base 90 to act against a tensile force of the wire 111 to continuously urge the bending arm 91 in a counterclockwise direction in FIG. 5. The first spring 101 serves as a return spring for the accelerator pedal 21.

A first pivot pin 92*a* and a second pivot pin 93*a* are installed on an upper surface of the first arm portion 91*b* of the bending arm 91 in a parallel manner, and a substantially central portion of a linear first link 92 is pivotally supported above the first pivot pin 92*a* in a freely rotating manner. The first link 92 is continuously urged in a clockwise direction in FIG. 5 by a second spring 102 tensioned between one end of the link and a suitable portion of the base 90 such that the link abuts against a stopper 123 formed to be projecting from an upper surface of the first arm portion 91*b* of the bending arm 91. A protrusion 121 is provided on the other end of the first link 92 for connection to a second link 93 as will be described later.

A substantially central portion of the linear second link 93 is pivotally supported at a second pivot pin 93*a* on the bending arm 91 in a freely rotating manner. An elongated hole 122 is formed at one end portion of the second link 93, and by fitting the protrusion 121 of the first link 92 into this elongated hole 122, the second link 93 is connected to the first link 92. A wire 112 is guided through another end of the second link 93 to a part of the base 90 to be connected to the throttle lever 131.

When the first link 92 abuts against the stopper 123 as illustrated in FIG. 5 and is substantially parallel with the first arm portion of the bending arm 91, it cannot be further oscillated in a clockwise direction. Thus, the second link 93 connected thereto cannot oscillate in a counterclockwise direction and is positioned and fixed with respect to the bending arm 91 in a substantially parallel condition with the first arm portion 91*b* of the bending arm 91.

A wire tube 124 is fixed at the second arm portion 91*c* of the bending arm 91, and one end of a wire 113 inserted through the wire tube 124 is connected via a third spring 103 to a portion of the second link 93 on a side opposite to the elongated hole 122 with the second pivot pin 93*a* being pinched therebetween. Another end of the wire 113 is connected to the sensor output arm 78 of the load sensor 34. When the load sensor 34 detects load torque and the sensor output arm 78 is accordingly rotated, the wire 113 is pulled and the second link 93 is elastically pulled by the third spring 103.

Tensile force of the first, second and third springs 101, 102, and 103 are set such that the force becomes larger from the first spring 101, second spring 102, and third spring 103 in this order when no external force is applied on the bending arm 91 or the second link 93.

Actions of a governor comprised with the governor link mechanism GL1 will now be explained.

When the accelerator pedal 21 is depressed from the condition as illustrated in FIG. 5, the bending arm 91 rotates in a clockwise direction in FIG. 5 with the first pivot pin 91*a* being the center against the first spring 101. At this time, the first link 92 urged by the second spring 102 will move integrally with the bending arm 91 while keeping on abutting against the stopper 123 so that the second arm 93 is also integrally moved with the first arm 92 and the bending arm 91 for pulling the wire 112 and rotating the throttle lever 131 in a direction for opening the throttle valve 130.

Since the moving direction of the second arm 93 at this time is equal to the urging direction of the third spring 103, the third spring 103 will be in a slacked condition than in its initial position as illustrated in FIG. 5 so that upon detection of load by the load sensor 34 and rotation of the sensor output arm 78, only the third spring 103 will be pulled by the wire 113 at the start of rotation of the sensor output arm 78 while the second link 93 is remained in a substantially parallel condition with the first arm portion 91*a*. Accordingly, the wire 112 will not be pulled and the throttle valve 130 will not be opened beyond a range as set by the accelerator pedal 21.

The throttle valve 130 will be opened beyond an amount as set by the accelerator pedal 21 only when the torque detected by the load sensor 34 exceeds a specified amount, the amount of pulling of the wire 113 by the sensor output arm 78 exceeds a pulling margin of the second spring 103, and the second link 93 is pulled by the wire 113 and the second spring 103 against the urging force of the second spring 102 applied on the second arm portion 91*b* (this urging force making the protrusion 121 press the second link 93) and is rotated with the second pivot pin 93*a* being the center.

Also in a condition in which the accelerator pedal 21 is in the initial position, the tensile force of the third spring 103 is smaller than the tensile force of the second spring 102 so that a specified play is present until the third spring 103 starts elastically pulling the second link 93 against the urging force of the second spring 102 when the sensor output arm 78 is rotated upon detection of load by the load sensor 34. Therefore, the throttle 130 will not be opened against the operator's will when the operator ceases depression of the accelerator pedal 21 for braking or easing acceleration owing to load torque instantly applied on the transmission 4 upon ceasing depression. It should be noted that the play between the sensor output arm 78 and the second link 93 when the accelerator pedal 21 is in the initial position (principally related to setting spring coefficients for the second spring 102 and third spring 103) is set to suit governor characteristics necessary for maintaining an idling condition.

Figure 17:
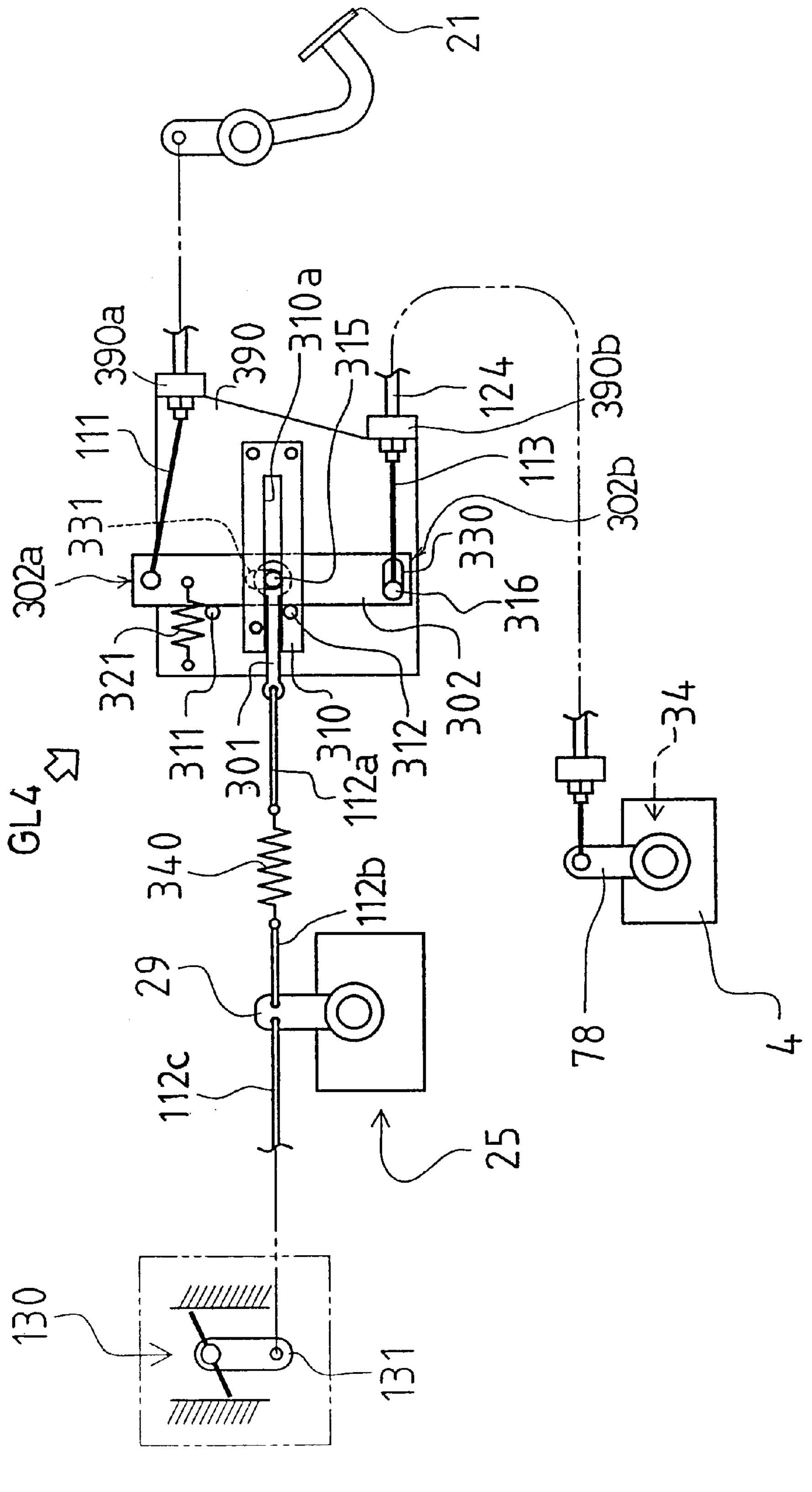
FIG. 17 is a systematic view of the fourth embodiment of the load detecting type governor of the present invention and a structural view of the governor link mechanism GL4 wherein the accelerator pedal 21 is in the initial position and no load torque is detected by the load sensor 34.

As illustrated in FIG. 17, it is preferable to interpose a sensor output arm 29 of a revolution speed sensor 25 (an ordinary centrifugal governor) to the wire 112 that is connected to the throttle lever 131 in a manner as described later in the specification. This arrangement is also preferably employed in the governor employing the governor link mechanism GL2 as illustrated in FIGS. 6 to 13 and in the governor employing the governor link mechanism GL3 as illustrated in FIG. 14.

Figure 6:
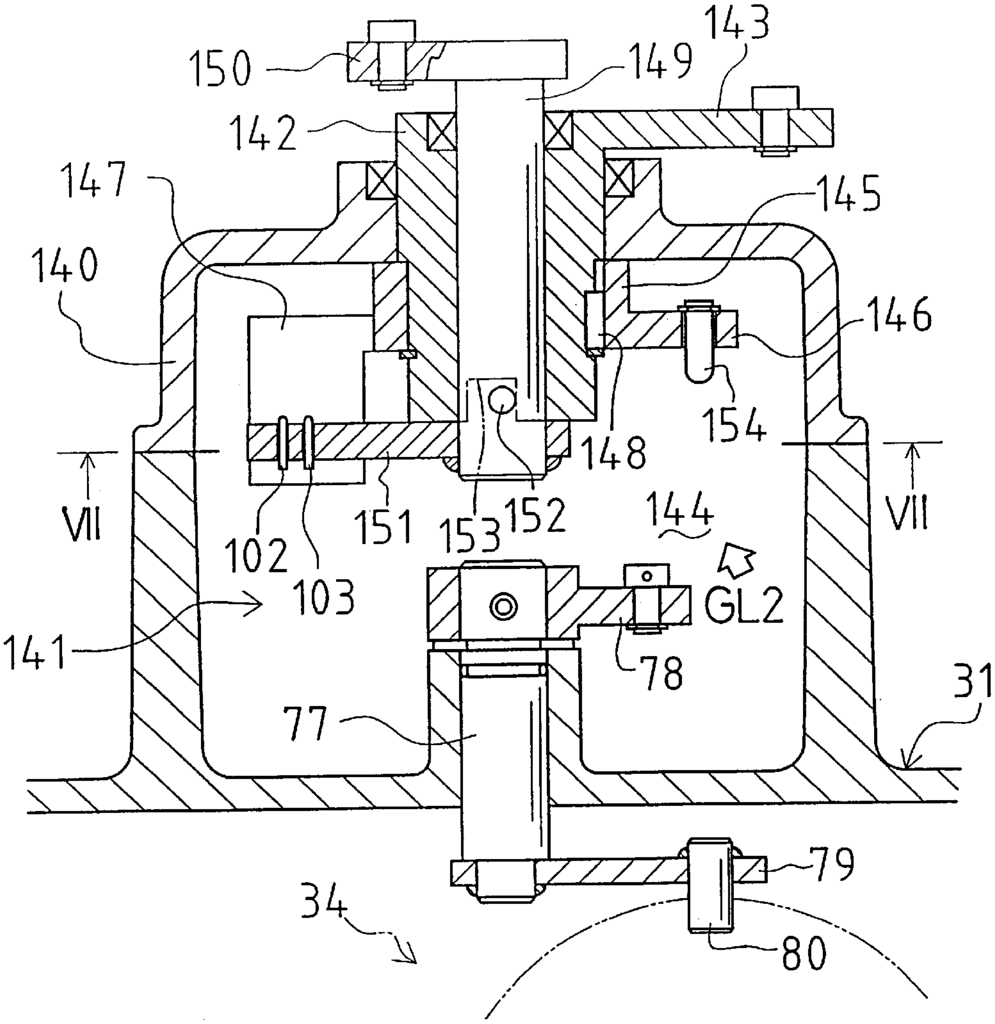
FIG. 6 is a side sectional view of a governor link mechanism GL2 of a type incorporated in a transmission case as employed in a second embodiment of the load detecting type governor of the present invention.
Figure 7:
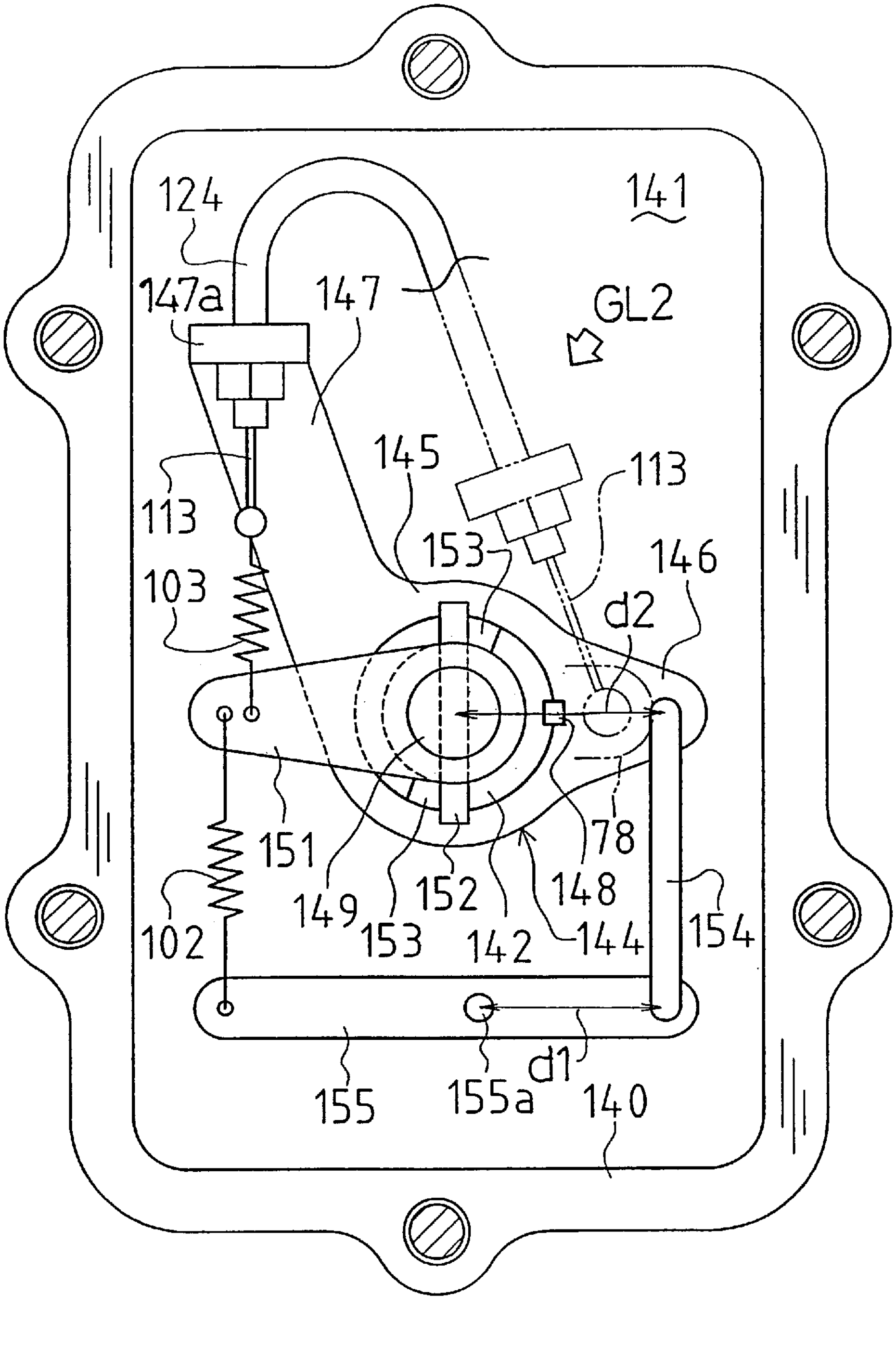
FIG. 7 is a view seen from a direction as indicated by arrow VII—VII in FIG. 6.
Figure 8:
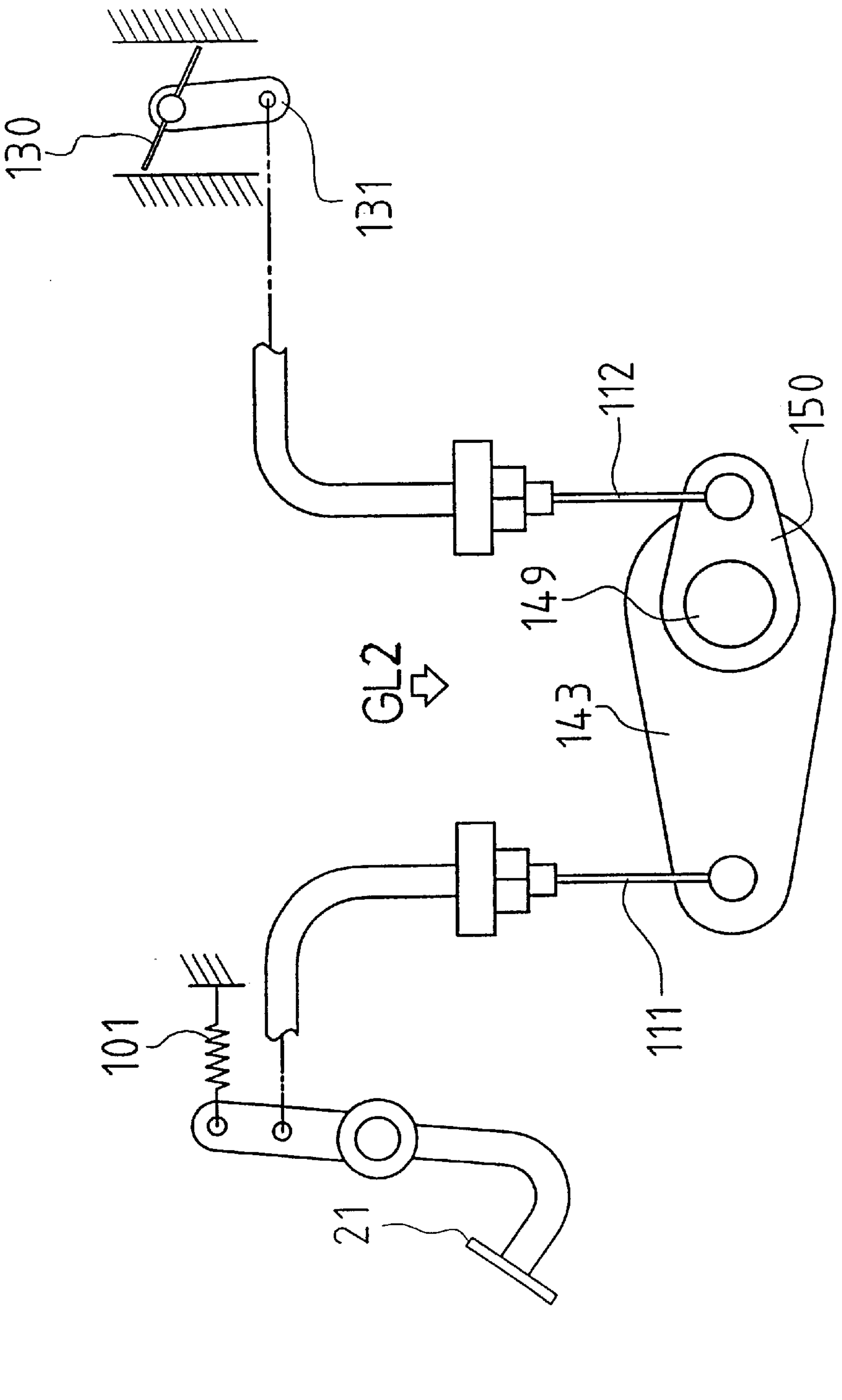
FIG. 8 is a systematic view showing a structure for linking an accelerator pedal 21 (output setting means) and a throttle valve 130 (output adjusting means) to the governor link mechanism GL2.

The governor link mechanism GL2 of a type incorporated in the transmission case as illustrated in FIGS. 6 to 8 will now be explained. A part of an upper wall of the transmission case 31 is extending upward as to surround the sensor output arm 78 supported by the transmission case 31 (leftward case half 31L) as illustrated in FIG. 3. An upside down bowl-shaped cover 140 is provided to cover an upper end aperture of the case wherein an internal space formed by the cover 140 and the extending portion of the case half 31L is defined to be a governor link chamber 141. The governor link mechanism GL2 is disposed in this governor link chamber 141 that exhibits similar functions as the above-described governor link mechanism GL1 but is arranged to be further compact. By protection through the transmission case 31 or the cover 140, it is possible to eliminate cases in which dust enters clearances formed between parts of the governor link mechanism GL2 to cause poor operations thereof.

As illustrated in FIG. 6, the governor link mechanism GL2 is arranged so that a vertical base cylinder 142 is supported on an upper wall of the cover 140 in a freely rotating manner for positioning the base cylinder 142 immediately above the sensor output arm 78. An accelerator input arm 143 is integrally extending from an end portion of the base cylinder 142 outside of the cover 140 in a radial manner, and a tip end of the accelerator input arm 143 is connected to the accelerator pedal 21 through the wire 111 as illustrated in FIG. 8.

As shown in FIGS. 6 and 7, a first connecting arm 144 is fitted and fixed on an outer periphery of the base cylinder 142 and is incapable of relatively rotating therewith due to a key 148. The first connecting arm 144 is comprised of a boss portion 145 that is fitted to the base cylinder 142, as well as a first arm portion 146 and a second arm portion 147 extending radially from the boss portion 145.

As illustrated in FIG. 8, the first spring 101, which is a return spring, is mounted to the accelerator pedal 21. The first spring 101 is also used for urging the accelerator input arm 143, base cylinder 142, and the first connecting arm 144 in a counterclockwise direction in FIG. 7 through the wire 111.

However, it is also possible to employ alternative arrangements in which the first spring 101 is mounted to the accelerator input arm 143 or to the first connecting arm 144.

A throttle adjusting shaft 149 is inserted and fitted into the base cylinder 142 in a coaxial manner to be supported in a relatively rotating manner. One end of the throttle adjusting shaft 149 is projecting out from the base cylinder 142 outside of the cover 140, and a base end of a throttle adjusting arm 150 is integrally fixed to this projecting portion, wherein the wire 112 is interposed between the tip end of the throttle adjusting arm 150 and the throttle lever 131.

An end portion of the throttle adjusting shaft 149 within the governor link chamber 141 is made to extend out from an end surface of the base cylinder 142 by a specified length, and a base end of a second connecting arm 151 is fixed to this extending portion.

A pin 152 is inserted into a portion within the governor link chamber 141 at which the throttle adjusting shaft 149 faces the end surface of the base cylinder 142 such that the pin 152 is perpendicular to an axis of the throttle adjusting shaft 149. The pin 152 is fixed with both ends thereof projecting from the outer peripheral surface of the throttle adjusting shaft 149 in radial directions. A pair of notches 153 is notched to the end surface of the base cylinder 142 at positions matching the projecting portions of the pin 152. Each notch 153 has a suitable width extending in the circumferential direction of the base cylinder 142 when seen from the top that is larger than the diameter of the pin 152 and portions of the pin 152 projecting from both ends of the throttle adjusting shaft 149 are made to be positioned into each of the notches 153.

As illustrated in FIG. 7, a pivot pin 155*a* is provided to project from an inner wall of the governor link chamber 141, this pivot pin 155*a* pivotally supporting a midpoint portion of an oscillating link 155. A tip end of the first arm portion 146 of the first connecting arm 144 and one end of the oscillating link 155 are pivotally connected through a connecting rod 154. The second spring 102 is interposed between the other end of the oscillating link 155 and the tip end of the second connecting arm 151. The position of the pivot pin 155*a* is set such that a distance d1 between the axial center of the pivot pin 155*a* and the connecting portion of the connecting rod 154 attached to the oscillating link 155 is shorter than a distanced d2 between the axial center of the throttle adjusting shaft 149 and the connecting portion of the connecting rod 154 attached to the tip end of the first arm portion 146.

As illustrated in FIG. 7, an end portion of the wire tube 124 is fixed at a stay portion 147*a* formed at a tip end of the second arm portion 147 of the first connecting arm 144 fixed to the base cylinder 142. One end of a wire 113 that is inserted through the wire tube 124 is connected to a tip end of the sensor output arm 78 of the load sensor 34, and the other end thereof is connected, via the third spring 103, to a tip end of the second connecting arm 151 fixed to the throttle adjusting shaft 149.

The wire 113 will not be pulled unless the load sensor 34 detects load torque, and assuming that the base cylinder 142 and the throttle adjusting shaft 149 are integrally rotated, the distance between the tip end of the second connecting arm 151 and the end of the wire tube 124 will not be changed and the tensile force of the third spring 103 will not be varied. The second connecting arm 151 is urged by a tensile force corresponding to the tensile force of the second spring 102 decreased by the tensile force of the third spring 103 in a condition in which the pin 152 abuts the ends of the notches 153 (as illustrated in FIG. 7). By setting the tensile force of the second spring 102 to be larger than the tensile force of the third spring 103, an urging force Ta (see FIG. 9) will apply a moment Ma (see FIG. 9) to the throttle adjusting shaft 149 in a counterclockwise direction. With this arrangement, a condition in which the pin 152 is pressed against the base cylinder 142 through the end portions of the notches 153 is maintained, and the throttle adjusting shaft 149 (throttle adjusting arm 150) and the base cylinder 142 (accelerator input arm 143) will be in an elastically connected condition.

Figure 9:
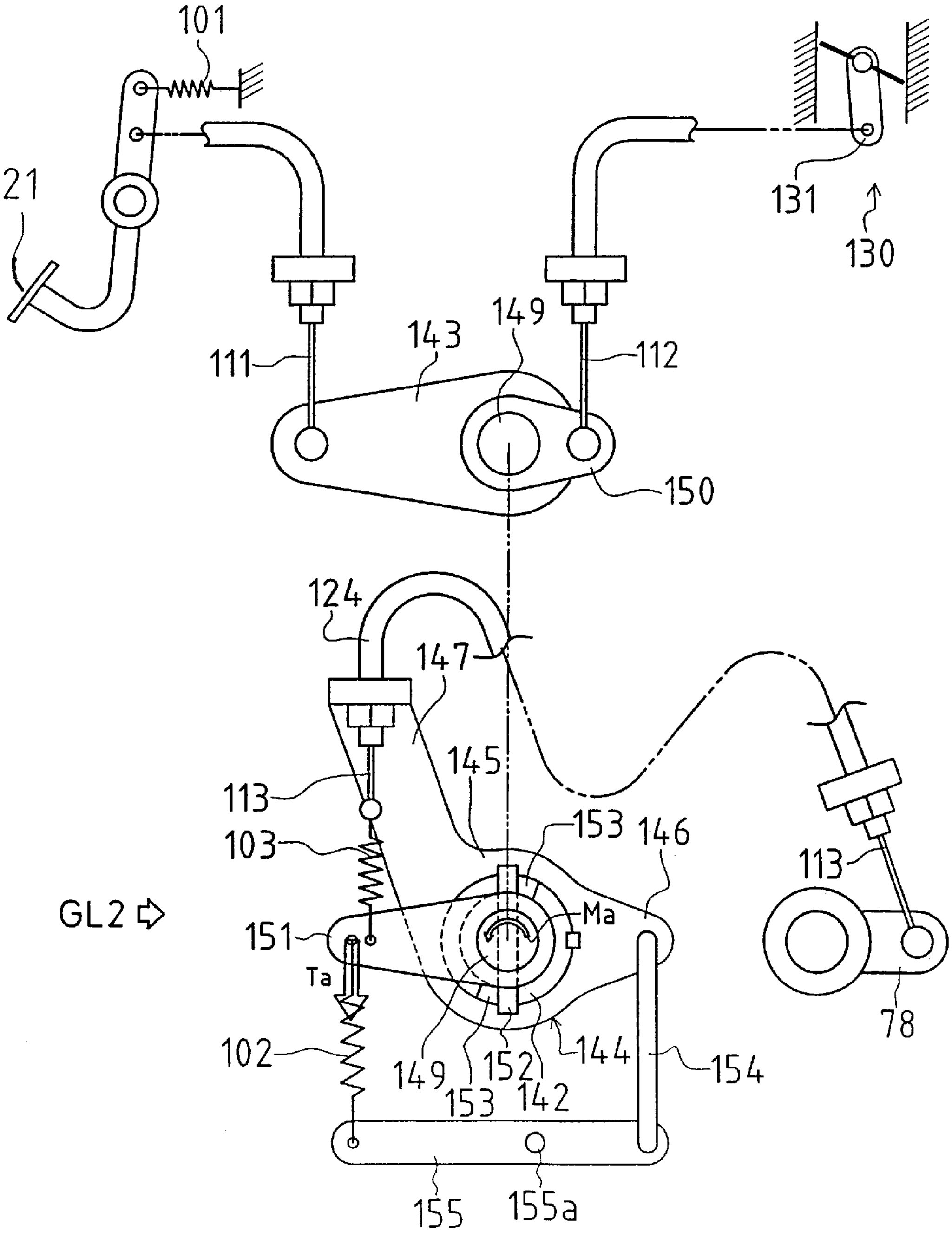
FIG. 9 is a systematic view of the second embodiment of the load detecting type governor and a structural view of the governor link mechanism GL2 wherein the accelerator pedal 21 is in the initial position and no load torque is detected by the load sensor 34.

The more the accelerator pedal 21 is depressed in a condition in which the load sensor 34 does not detect load torque, the more the wire 111 will pull the accelerator input arm 143, such that the first connecting arm 144 is rotated in a clockwise direction in FIG. 9. At this time, the oscillating link 155 is also tilted via the connecting rod 154 in a clockwise direction with the pivot pin 155*a* being the center, and the second connecting arm 151 will be integrally rotated with the first connecting arm 144 owing to the elastic connection between the throttle adjusting shaft 149 and the base cylinder 142. However, the distance between the end portion of the oscillating link 155 on the mounting side of the second spring 102 and the tip end of the second connecting arm 151 will become shorter due to the positional relationship between the throttle adjusting shaft 149 and the pivot pin 155*a* (as already described with reference to distances d1, d2), such that the tensile force of the second spring 102 elastically provided between these members 155, 151 is decreased. Therefore, the urging force Ta will become smaller, the more the accelerator pedal 21 is depressed, and the moment Ma of the throttle adjusting shaft 149 in a counterclockwise direction is accordingly decreased to thereby weaken the elastic bonding force between the throttle adjusting shaft 149 (throttle adjusting arm 150) and the base cylinder 142 (accelerator input arm 143). However, since the tensile force of the second spring 102 is set so as not to become less than the tensile force of the third spring 103, the urging force Ta will not be completely negated.

Figure 11:
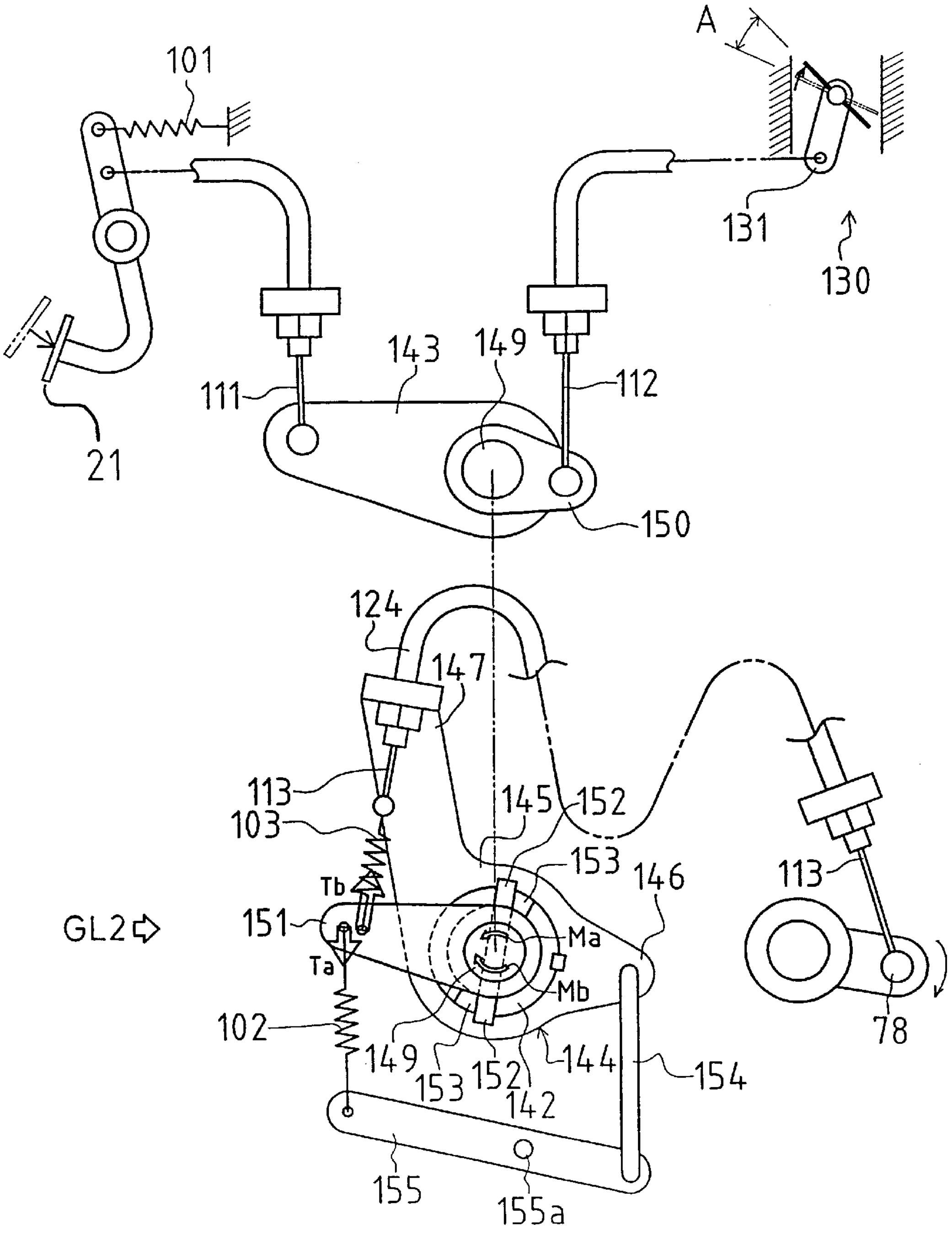
FIG. 11 is a similar view wherein the accelerator pedal 21 is depressed, load torque is detected by the load sensor 34 but the detected value has not yet reached a value for further displacing the throttle valve 130 to an output increasing side.

The third spring 103 elongates from a length in a condition in which it is pulled by the wire 113 upon detection of load torque by the load sensor 34 and in which the throttle adjusting shaft 149 and base cylinder 142 are elastically connected (initial length) and creates a tensile force Tb. As shown in FIG. 11, the tensile force Tb results in a moment Mb being applied in a clockwise direction on the throttle adjusting shaft 149. As illustrated in FIG. 11, when the tensile force Tb exceeds the urging force Ta, the second connecting arm 151 will be pulled in the direction of tensile force Tb within the range of the play of the pin 152 within the notches 153 so that: the moment Ma will exceed Mb; the elastic connection between the throttle adjusting shaft 149 and the base cylinder 142 is disconnected; and the throttle adjusting arm 150 is moved further to the output increasing side from the rotating position as defined by depressing the accelerator pedal 21 for increasing the opening of the throttle valve 130.

Figure 12:
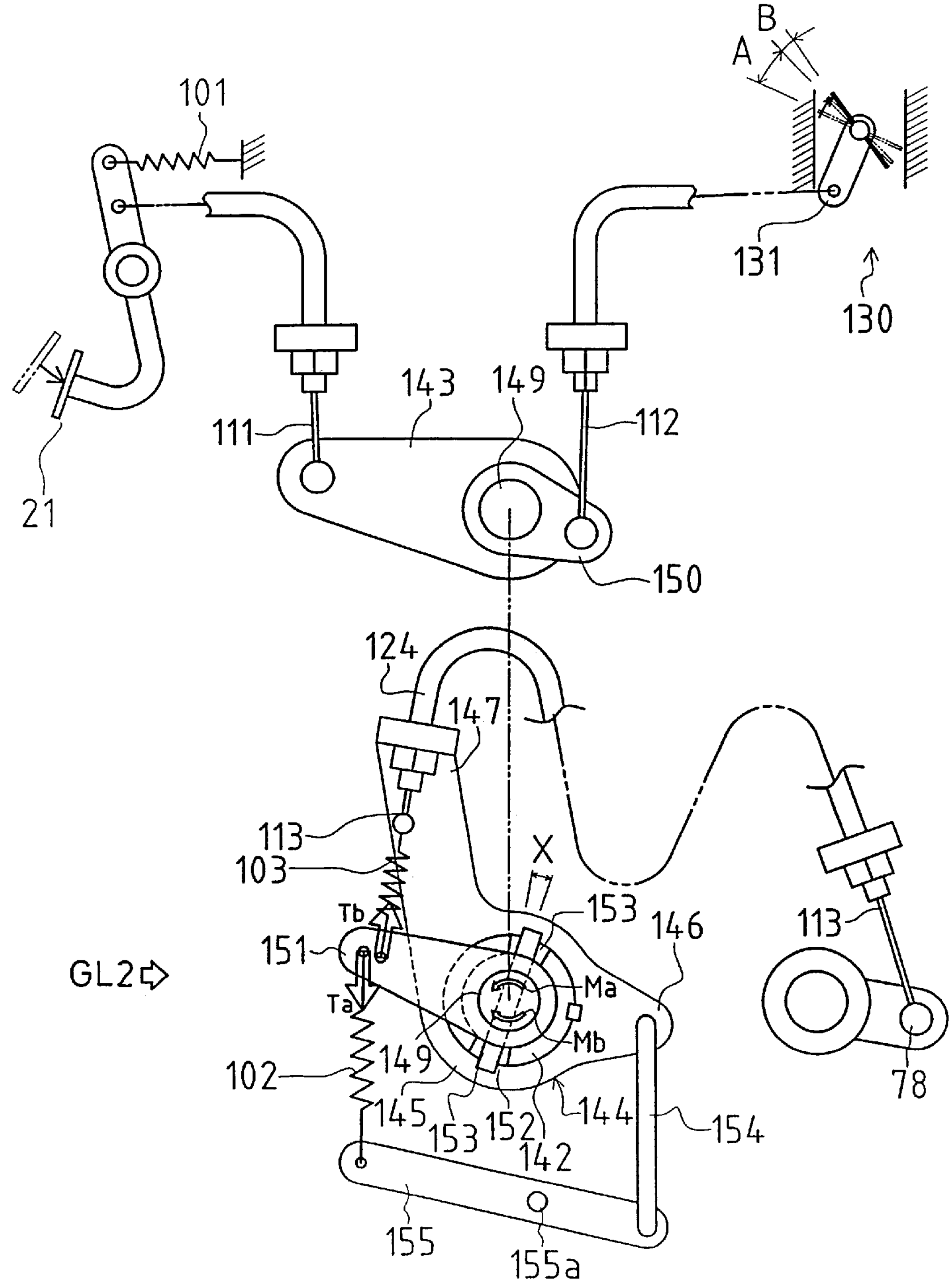
FIG. 12 is a similar view wherein the accelerator pedal 21 is depressed, load torque is detected by the load sensor 34, and the throttle valve 130 has been further displaced from a position as defined by the accelerator pedal 21 based on detection by the load sensor 34.

It should be noted that the tensile force Tb is decreased the more the second arm 151 is pulled by the wire 113 owing to decreases in the amount of expansion of the third spring 103, while the amount of expansion of the second spring 102 becomes larger to cause an increase in the urging force Ta. Finally, the second connecting arm 151 is in equilibrium at a position at which Ta and Tb are balanced. FIG. 12 illustrates such a condition.

Figure 13:
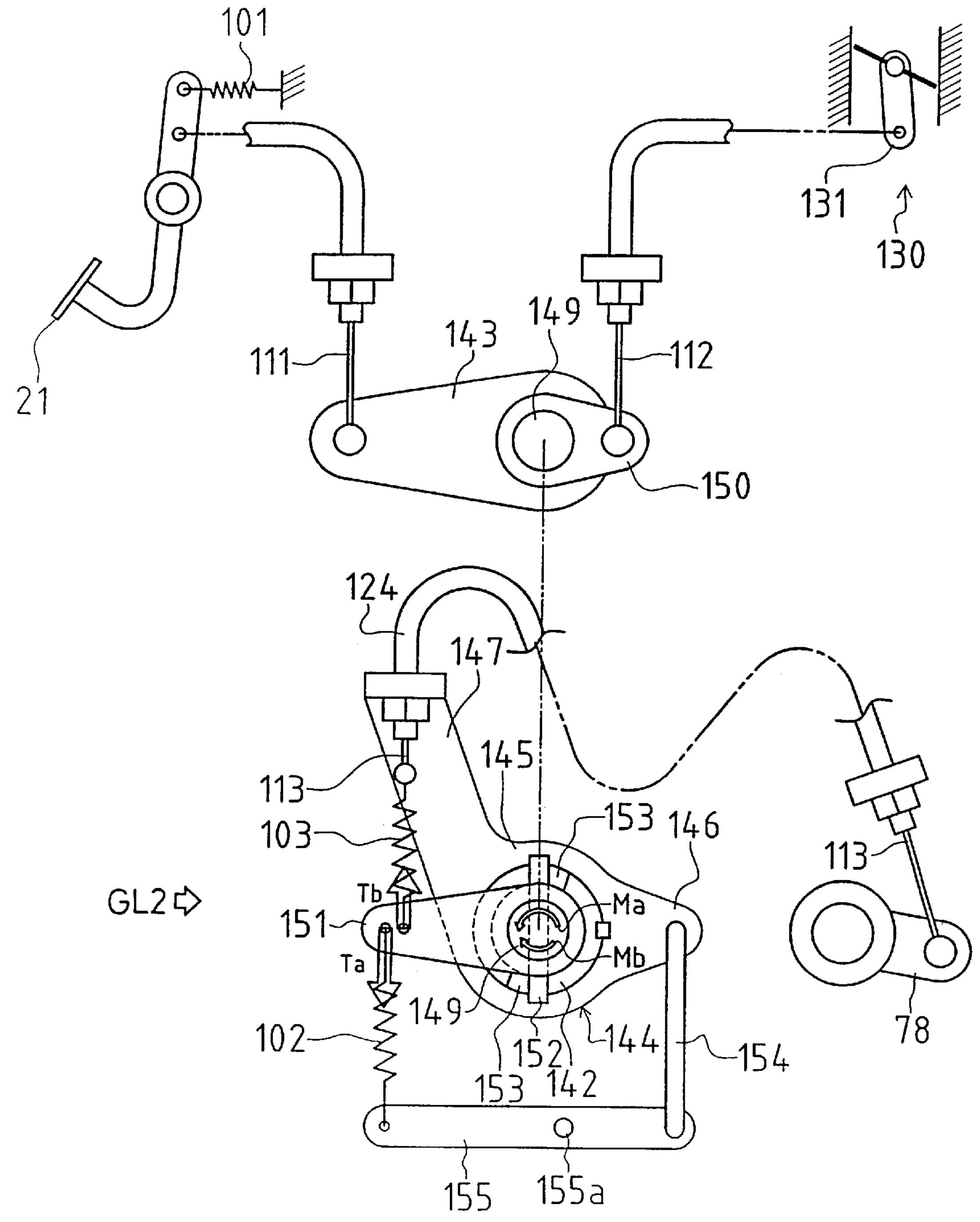
FIG. 13 is a similar view wherein the accelerator pedal 21 is in the initial condition, and load torque is detected by the load sensor 34.

While the tensile force Tb is increased as the load detected by the load sensor 34 increases, the urging force Ta is increased as the amount of depression of the acceleration pedal 21 decreases, as already described. The urging force Ta becomes maximum when the accelerator pedal 21 as well as the load sensor 34 are in their initial conditions, as illustrated in FIG. 9. By setting the maximum tensile force Tb applied on the second connecting arm 151 upon detection of a maximum detecting value by the load sensor 34 to be smaller than the urging fore Ta, as determined at the initial position or within a slightly depressed region including the initial position of the accelerator pedal 21, the second connecting arm 151 will not be pulled by tensile force Tb, even upon detection of load torque by the load sensor 34, as long as the accelerator pedal 21 is in these positions. Thus, the elastic connection between the throttle adjusting shaft 149 and the base cylinder 142 will be maintained and the throttle valve 130 is maintained in the initial position or an output position as set by slightly depressing the accelerator pedal 21. FIG. 13 illustrates such a condition (particularly in which the accelerator pedal 21 is in the initial position).

It should be noted that when the urging force Ta decreases due to further depression of the accelerator pedal 21 and exceeds the tensile force Tb that is initially applied upon detection of the load sensor 34 but is lower than the maximum value of the tensile force Tb corresponding to the maximum detecting value, the elastic connection between the throttle adjusting shaft 149 and the base cylinder 142, with respect to load detection of the load sensor 34, will not be disconnected unless the detected value of the load sensor 34 increases to some extent. More particularly, a delay is generated in the output increasing response of the throttle valve 130 with respect to detection of load torque by the load sensor 34. At the time of low output operation, too sensitive response increases that result in throttle valve 130 opening in response to load torque detection will cause the running speed to increase or decrease in a frequent and detailed manner which is undesirable. Such delays in response of output increasing control of the present governor in response to load detection are suitably performed for operations at low outputs. The output controlling response upon detection of load will become faster with decreases in urging force Ta through depressing the accelerator pedal 21, and during high output operations, outputs will be rapidly increased upon detection of load to thereby eliminate decreases in output revolution speed.

Forms for controlling the governor employing the above-described governor link mechanism GL2 corresponding to various driving conditions of the vehicle will now be explained with reference to FIGS. 9 to 13.

FIG. 9 illustrates a condition in which the vehicle is halted in an engine idling condition wherein the accelerator pedal 21 is in the initial position and the load sensor 34 is not detecting load torque. At this time, the wire 111 and wire 113 are not pulled and the integrally formed accelerator input arm 143, base cylinder 142, and the first connecting arm 145 are maintained in their initial positions through tensile force of the first spring 101. The throttle adjusting shaft 149 is elastically connected to the base cylinder 142 in the initial position through urging force Ta for positioning the throttle adjusting arm 150 in the initial position, and the throttle valve 130 of the carburetor of the engine is maintained in a condition in which it is open to an extent with which idling rotation is enabled.

Figure 10:
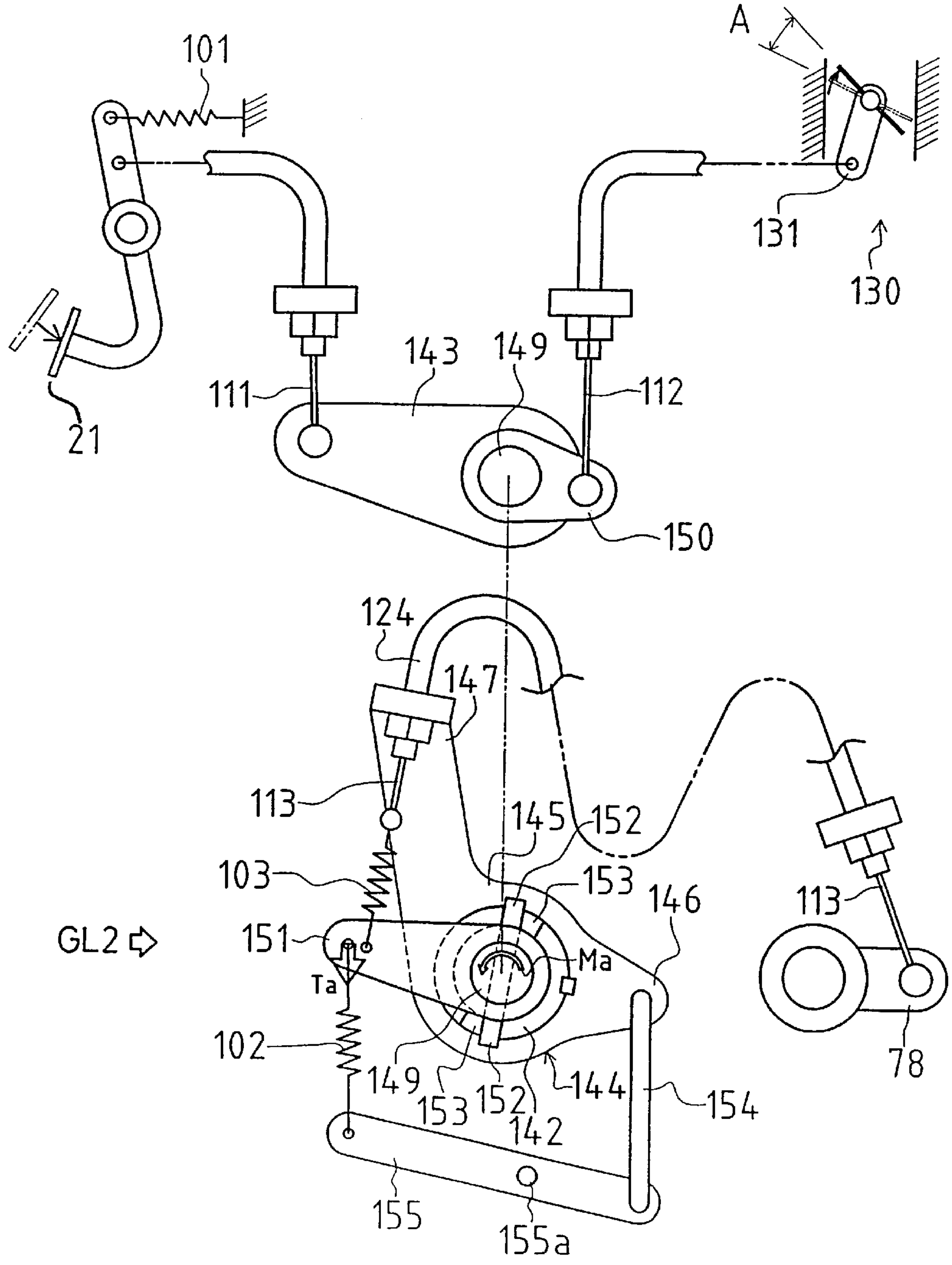
FIG. 10 is a similar view wherein the accelerator pedal 21 is depressed and no load torque is detected by the load sensor 34.

FIG. 10 illustrates a condition in which the accelerator pedal 21 is depressed by a specified amount for constant-speed running on a flat road, wherein the accelerator input arm 143 and the base cylinder 142 are oscillated from their initial positions as illustrated in FIG. 9 in a clockwise direction by being pulled by the wire 111 connected to the accelerator pedal 21. The load sensor 34 detects no load torque during running on a flat road, and only urging force Ta is applied on the second connecting arm 151 while the pin 152 is maintained in a condition in which it is pressed against the base cylinder 142 within the notches 153 and the throttle adjusting shaft 149 is kept elastically connected to the base cylinder 142 through moment Ma in a clockwise direction. Therefore, the throttle adjusting arm 150 that is fixed to the throttle adjusting shaft 149 is also oscillated in a clockwise direction from the initial position as illustrated in FIG. 9 and the opening of the throttle valve 130 is increased by the oscillated amount via the wire 112 and the throttle lever 131. An amount of depressing the accelerator pedal 21, that is, a rotation angle of the throttle lever 131 of throttle valve 130 that corresponds to a value for the engine output set by the output setting means, is indicated by reference A in FIG. 10.

FIGS. 11 and 12 illustrate serial movements of the governor (especially the second connecting arm 151, throttle adjusting shaft 149 and the throttle adjusting arm 150) when rotational resistance is applied on the wheels and load torque is generated in the transmission 4 as the vehicle, which was running on a flat road, starts running uphill. As soon as the sensor output arm 78 starts rotation upon detection of load torque by the load sensor 34, the third spring 103 is expanded by being pulled by the wire 113, and tensile force Tb is applied on the second connecting arm 151 in a direction opposite to the urging force Ta as illustrated in FIG. 11. When this tensile force Tb exceeds the urging force Ta and the clockwise moment Mb applied on the throttle adjusting shaft 149 exceeds the counterclockwise moment Ma, the elastic connection of the throttle adjusting shaft 149 with respect to the base cylinder 142 will be released such that the second connecting arm 151 is rotated in a clockwise direction.

Accompanying the clockwise rotation of the second connecting arm 151, the tensile force Tb will be attenuated and the urging force Ta increased. As shown in FIG. 12, Ta and Tb will become equal so that the second connecting arm 151 is in equilibrium, the position of the throttle adjusting arm 150 integral with the second connecting arm 151 is defined, and the opening of the throttle valve 130 will be further increased from opening A (as defined by the depression of accelerator pedal 21) to opening B (as defined by the load torque detected by the load sensor 34) so as to increase the output revolution of the engine for coping with the rotational resistance of running the transmission uphill.

Then, when the accelerator pedal 21 is released from the depressed condition for braking or abruptly slowing the speed, the accelerator pedal 21 is smoothly returned to the initial position by the first spring 101 as illustrated in FIG. 13. At this time, rotational resistance is applied on the wheels so that the load sensor 34 detects load torque and the sensor output arm 78 is rotated such that the third spring 103 is expanded by the wire 113 to generate tensile force Tb. However, since the urging force Ta acting against this tensile force is sufficiently large in the initial position of the accelerator pedal 21, the counterclockwise moment Ma of the throttle adjusting shaft 149 exceeds the clockwise moment Mb so that the elastic connection between the throttle adjusting shaft 149 and the base cylinder 142 is maintained and merely the third spring 103 is expanded. Accordingly, the second connecting arm 151 and the throttle connecting arm 150 integrally formed therewith will be maintained in initial positions and the throttle valve 130 assumes the idling rotating position with its opening being prevented from further increasing. In other words, load torque detection by the load sensor is cancelled. In this manner, the engine output is smoothly reduced in speed to the idling condition in a forced manner and the braking distance or time for reducing the speed will not be inappropriately increased.

The arrangement of the governor link mechanism GL3 as illustrated in FIG. 14 will now be explained. A base 290 is formed, at suitable lateral end portions thereof, with wire tube receiving portions 290*a*, 290*b*, and 290*c* for fixing respective tube ends of the wire 111 extending from the accelerator pedal 21, the wire 112 extending from the throttle lever 131, and the wire 113 extending from the sensor output arm 78 of the load sensor 34.

A guide rail 210 is laid on a surface of the base 290 in a sloped manner (a condition close to a diagonal), and a sliding portion 212 having a substantially U-shaped section is fixed on a rear surface of a flat sliding plate 201 for pinching and holding the guide rail 210 in a freely sliding manner.

The end portion of the wire 111 extending from the accelerator pedal 21 is connected to a suitable position on the sliding plate 201. When the accelerator pedal 21 is depressed, the sliding plate 201 is pulled along the guide rail 210 (in a left downward direction in FIG. 14) in accordance with the amount of depression.

A first spring 221 is interposed between the sliding plate 201 and the base 290 to act against the tensile force of the wire 111 and to continuously urge the sliding plate 201 in a right upward direction in FIG. 14. By this urging force, the sliding plate 201 is rested with its end edge being abutted against a stopper 211 formed on the guide rail 210 as to project therefrom when the accelerator pedal 21 is not depressed.

A pivot pin 202*c* is installed at a suitable position on an upper surface of the sliding plate 201 and an oscillating link 202 formed to assume a shape of the letter L is pivotally supported on the pivot pin 202*c* in a freely sliding manner. The oscillating link 202 is arranged in that a first arm portion 202*a* and a second arm portion 202*b* are extending in two directions (substantially perpendicular to one another in this embodiment) from the pivotally supported portion of the pivot pin 202*c*.

An elongated hole 230 of a suitable length is formed to be open at a tip end of the first arm portion 202*a* and a sliding pin 113*a* provided at an end portion of the wire 113 extending from the sensor output arm 78 is fitted into the elongated hole 230 in a freely sliding manner. The elongated hole 230 is directed substantially in a direction to which the wire 113 pulls the first arm portion 202*a* through rotation of the sensor output arm 78 accompanying increases in the detected value of the load sensor 34. The wire 113 and the first arm portion 202*a* are connected with a specified play. The amount of play, that is, the length of the elongated hole 230, comprises an amount with which maximum sliding of the sliding plate 201 on the guide rail 210 is permitted without moving the sliding pin 113*a* that occurs when the accelerator pedal 21 is fully depressed and no load torque is detected by the load sensor 34 (sensor output arm 78 is in the initial position). In other words, the length of the elongated hole 230 defines the maximum sliding amount of the sliding plate 201, that is, a full stroke of the accelerator pedal 21. The length of the elongated hole 230 is further set to permit a full stroke of the sensor output arm 78 when the accelerator pedal 21 is in the initial position.

The point is that a specified play should be permitted in the oscillating response of the first arm portion 202*a* (that is, the oscillating link 202) with respect to the rotation of the sensor output arm 78, so that it is alternatively possible to provide the play, for instance, through a slack in the wire 113 instead of the sliding structure of the sliding pin 113*a* within the elongated hole 230.

An end portion of the wire 112 that is connected to the throttle lever 131 is connected to a tip end of the second arm portion 202*b*. The throttle valve 130 of the carburetor is arranged in that its opening becomes larger the more the sliding plate 201 is slid in the left downward direction in FIG. 14 along the guide rail 210 and the more the oscillating link 202 is oscillated in a clockwise direction in FIG. 14 with the pivot pin 202*c* being the center, since the throttle lever 131 is pulled by the wire 112.

In this manner, the wire 112 and wire 113 are disposed such that their pulling directions are perpendicular with respect to each other. The direction of the guide rail 210 is set such that the direction to which the wire 111 connected to the accelerator pedal 21 pulls the sliding plate 201 (parallel with the guide rail 210), is in a diagonal relationship with the direction to which the wire 113 pulls the oscillating link 202, and the direction to which the oscillating link 202 pulls the wire 112.

A stopper 240 is formed to project from a surface of the sliding plate 201 such that the oscillating link 202 abuts against the second arm portion 202*b* when the link is oscillated in a counterclockwise direction in FIG. 14 with the pivot pin 202*c* being the center. When the stopper 240 abuts against the second arm portion 202*b* and the sensor output arm 78 is in the initial position, the sliding pin 113*a* is in a condition in which it abuts against the end portion of the elongated hole 230 that is furthest from the wire tube receiving portion 290*c*. Thus, play is provided in the oscillating response of the oscillating arm 202 with respect to pulling of the wire 113 upon rotation of the sensor output arm 78.

An extension 201*b* is integrally formed on the sliding plate 201 to be substantially parallel with the wire 112 formed between the wire tube receiving portion 290*b* and the second arm portion 202*b*. By interposing a second spring 222 between the extension 201*b* and the second arm portion 202*b*, the oscillating link 202 is urged in a counterclockwise direction in FIG. 14, so that the second arm portion 202*b* is pressed against the stopper 240. The urging force applied on the oscillating link 202 by the second spring 222 actuates in a direction opposite to the oscillation of the oscillating link 202 when the wire 113 performs pulling upon rotation of the sensor output arm 78 that accompanies increases in the load torque detected by the load sensor 34.

Actions of a governor employing the governor link mechanism GL3 of the above-described arrangement will now be explained. FIG. 14 illustrates an initial condition of the governor link mechanism GL3 when the load sensor 34 detects no load torque and the accelerator pedal 21 is not depressed. When the accelerator pedal 21 is depressed from this initial condition, the sliding plate 201 will be separated from the stopper 211 against the urging force of the first spring 221 as already described and slides the guide plate 210 in a left downward direction in FIG. 14 in proportion to the depressed amount such that the throttle lever 131 is pulled through the wire 112 to open the throttle valve 130. In this manner, the opening of the throttle valve 130 is adjusted in accordance with the amount of depressing the accelerator pedal 21.

As long as the load sensor 34 detects no load torque, the oscillating link 202 is moved integrally with the sliding plate 201 along the guide plate 210 with the second arm portion 202*b* being maintained pressed against the stopper 240. Accordingly, the more the sliding plate 201 performs sliding accompanying the depression of the accelerator pedal 21, the closer is the position of the sliding pin 113*a* within the elongated hole 230 moved relative to the tube receiving portion 290*c*. More particularly, the play in oscillating response of the oscillating link 202 with respect to pulling of the wire 113 by the rotation of the sensor output arm 78 decrease. However, since the length of the elongated hole 230 is set to permit maximum sliding of the sliding plate 201 with respect to the maximum depressing position of the accelerator pedal 21 when the load sensor 34 does not detect load torque (that is, the sensor output arm 78 is in the initial position), it will result in an arrangement in which some play will still be present also upon maximum depression of the accelerator pedal 21 or in which the play is cancelled only upon maximum depression.

When the load sensor 34 detects load torque and the sensor output arm 78 is accordingly rotated, the oscillating link 202 will not be oscillated when the amount of rotation is still within the range of play with respect to the depressed position of the accelerator pedal 21 but will remain pressed against the stopper 240 so that the opening of the throttle valve 130 is maintained at the opening corresponding to the amount of depression of the accelerator pedal 21.

When the load torque further increases such that the amount of rotation of the sensor output arm 78 exceeds the range of play for the oscillating response of the oscillating link 202 in response to pulling of the wire 113, the sliding pin 113*a* within the elongated hole 230 pushes the second arm portion 202*a* towards the tube receiving portion 290*c* against the urging force of the second spring 222 and the oscillating link 202 is oscillated in a clockwise direction in FIG. 14 thereby parting from the stopper 240. Thus, the throttle lever 131 is further pulled by the wire 112 such that the throttle valve 130 is further opened beyond the opening as set by the accelerator pedal 21.

When the accelerator pedal 21 is released for performing braking or slowing acceleration and the accelerator pedal 21 is returned to the initial position, the sliding range of the sliding pin 113*a* corresponding to the full stroke of the sensor output arm 78 is included within the range of play of the sliding pin 113*a* within the elongated hole 230 as already described. Accordingly, the oscillating link 202 will not be oscillated by parting from the stopper 240 upon generation of load torque in the transmission 4 that results from braking resistance or the like, and the throttle valve 130 will not be opened by the rotation of the sensor output arm 78. It should be noted that the sensor output arm 78 may be set to assume a condition in which it is not rotated when the accelerator pedal 21 is in the range from its initial position up to a specified low output set range by adjusting the amount of play.

As explained so far, the governor link mechanism GL3 exhibits functions similar to those of the governor link mechanism GL1 and the governor link mechanism GL2 in that the throttle valve 130, which serves as the engine output adjusting means, is not opened upon detection of load torque even though the load sensor 34 detects load torque when the accelerator pedal 21, which serves as the setting means for the engine output, is either in its initial position or in a specified low output set range. Further, governor link mechanism GL3 exhibits functions similar to the governor link mechanism GL2 in that the valve opening response of the throttle valve 130 in response to detection of the load sensor 34 becomes more rapid the larger the set output of the accelerator pedal 21 becomes.

However, in the governor link mechanisms GL1 and GL2, spring coefficients, especially those of the second spring 102 and the third spring 103, need to be delicately set in view of the mutual relationship thereof. It is further necessary to pay attention to the positional relationship between the throttle adjusting shaft 149 and the pivot pin 155*a* in the governor link mechanism GL2. In this respect, the governor link mechanism GL3 allows relatively easy setting of positions of each member and spring coefficients of the two springs 221, 222 need not be considered in view of mutual relationship. The spring 221 just needs to be set with respect to the sliding plate 201 and the spring 222 with respect to the oscillating link 202 such that suitable urging force may be respectively applied. Consequently, the governor link mechanism GL3 is of simpler design than that of governor link mechanisms GL1 and GL2.

The above-described arrangements of the governor of the present invention according to the first embodiment as illustrated in FIG. 5, the second embodiment as illustrated in FIGS. 6 to 13 and the third embodiment as illustrated in FIG. 14 will be summarized. In general, these governors perform by controlling engine outputs with respect to generated load torque by displacing the position of the throttle valve 130 (an output adjusting means), as defined by the accelerator pedal 21 (an output setting means), to an output increasing side in accordance with a detected value when the load sensor 34 (a load detecting means) detects load torque.

For this purpose, a movable member is provided that is displaced on a basis of a value as set by the accelerator pedal 21 and that is linked to the throttle valve 130. Further, the movable member is linked to the load sensor 34 for further displacing the position of the movable member beyond the value set by the accelerator pedal 21 upon detection of load torque by the load sensor 34, such that the throttle valve 130 is further displaced to the output increasing side. Such a movable member is particularly comprised by the second link 93 in the first embodiment as illustrated in FIG. 5, by the throttle adjusting arm 150 (and members integrally formed therewith) in the second embodiment as illustrated in FIG. 6 and others, and by the oscillating link 202 in the third embodiment as illustrated in FIG. 14.

However, when the set output value as set by the accelerator pedal 21 is an initial value or a specified low output set region including the initial value, the throttle valve 130 is maintained at the position as defined by the accelerator pedal 21 even upon detection of load torque by the load sensor 34. Thus, play is provided for the linkage between the load sensor 34 and the movable member such that the movable member is not displaced upon detection of load torque by the load sensor 34 when the value set by the accelerator pedal 21 is the initial value or in the specified low output set region including the initial value.

Further, particularly in the second embodiment as illustrated in FIG. 6 and others and in the third embodiment as illustrated in FIG. 14, with increases in the value set by the accelerator pedal 21 beyond the initial value or the specified low output set region including the initial value, the response speed of the throttle valve 130 with respect to load detection by the load sensor is increased. Thus, the play between the load sensor 34 and the movable member is set to be decreased and finally eliminated with increases in the value set by the accelerator pedal 21 beyond the initial value or the specified low output set region including the initial value.

It will now be explained the governor link mechanism GL4 as illustrated in FIG. 15. A tube receiving portion 390*a* for fixing a wire tube end of the wire 111 extending from the accelerator pedal 21 (not shown in FIG. 15) and a tube receiving portion 390*b* for fixing a wire tube end of the wire 113 extending from the sensor output arm 78 (not shown in FIG. 15) of the load sensor 34 are integrally formed at a base 390.

A rectangular flat guide member 310 is fixed on a surface of the base 390. A guide groove 310*a* is notched on the guide member 310 to extend in a longitudinal direction thereof (lateral direction in FIG. 15), wherein a connecting pin 315 is inwardly fit to the guide groove 310*a* to be freely sliding along the guide groove 310*a*.

An output rod 301, which is an output terminal member of the governor link mechanism GL4 serving as a second movable member in a governor (to be described later) as illustrated in FIG. 17 and others employing the governor link mechanism GL4, is disposed on the surface of the base 390 as to be guided by the guide groove 310*a*, with the connecting pin 315 being inserted into one end thereof while the other end is made to project out from the guide groove 310*a* and the wire 112 being extended from this other end towards the throttle lever 131 (omitted in FIG. 15).

A rectangular flat link plate 302 is formed between the surface of the base 390 and the guide member 310 to be substantially perpendicular to the guide member 310 in an initial position thereof as illustrated in FIG. 15. An elongated hole 331 is notched at a substantially central position of the link plate 302 that extends along a longitudinal direction thereof with the connecting pin 315 being inserted into the elongated hole 331. Such a link plate 302 connected to the output rod 301 via the connecting pin 315 moves along the guide groove 310*a* together with the sliding of the connecting pin 315 within the guide groove 310*a* and is arranged to be freely sliding with the connecting pin 315 being the center.

Wires 111 and 113 are respectively provided to extend from respective wire tubes fixed to the tube receiving portions 390*a*, 390*b* to be substantially perpendicular to the link plate 302 in the initial position. An end portion of the wire 111 is pivotally supported by a first end portion 302*a* of the link plate 302 to be fixed in position. An end portion of the wire 113 is formed as a sliding pin 316 and is inwardly fitted in a freely sliding manner in an elongated hole 330 that is substantially parallel (that is, extending along a pulling direction of the wire 112) to the guide groove 310*a* and that is open to a second end portion 302*b* of the link plate 302. The point is that a specified play should be permitted in the pulling of the second end portion 302*b* of the link plate 302 by the wire 113 accompanying the rotation of the sensor output arm 78, so that it is alternatively possible to provide the play, for instance, through a slack in the wire 113 instead of the structure of the sliding pin 316 and the elongated hole 330.

For continuously urging the link plate 302 in a leftward direction in FIG. 15 against the tensile force of the wire 111, one end of a return spring 321 is connected to a portion of the link plate 302 between the connecting end portion of the wire 111 and the connecting pin 315, and the other end of the return spring is connected to the base 390. A first stopper 311 is formed as to project from the surface of the base 390 at a position proximate to the return spring 321 while a second stopper 312 is similarly formed on a side opposite to the first stopper 311 with the guide groove 310*a* being pinched therebetween. In this manner, the link plate 302 is maintained pressed against both stoppers 311, 312 as illustrated in FIG. 15 through the urging force of the return spring 321 when the accelerator pedal 21 is in the initial position.

The more the accelerator pedal 21 is depressed, the more rightward is the first end portion 302*a* of the link plate 302 moved in FIG. 15 against the urging force of the return spring 321. The sensor output arm 78 is rotated in accordance with a value detected by the load sensor 34 so as to pull the wire 113, whereupon the sliding pin 316 is first slid within the region of play within the elongated hole 330 and the sliding pin 316 accordingly presses the second end portion 302*b* of the link plate 302 rightward in FIG. 15.

It should be noted that the length of the elongated hole 330 is set such that the entire length of the elongated hole 330 comprises the range of play for the sliding pin 316, that is, such that the second end portion 302*b* of the link plate 302 is not pulled by the wire 113 even upon maximum rotation of the sensor output arm 78 when the link plate 302 is in the initial position, that is, the accelerator pedal 21 is not being depressed.

In the governor link mechanism GL4, the return spring 321 for returning the accelerator pedal 21 to the initial position concurrently serves as an urging member for the link plate 302 against the rotation of the sensor output arm 78 since the pulling direction for the link plate 302 provided by the wire 111 and the pulling direction by the wire 113 are substantially parallel. More particularly, in contrast to the governor link mechanism GL3 employing two springs 221, 222 as respective urging members for the pulling direction for the sliding link 201 by the wire 111 and the pulling direction for the sliding link 202 by the wire 113 since these directions are different (intersecting), the governor link mechanism GL4 employs only one spring 321 and is thus further simplified over the governor link mechanism GL3, which, in turn, has been simplified over the governor link mechanisms GL1 and GL2. Moreover, the principal movable portions being only the link plate 302 and the output rod 301 and the number of movable members being small, assembly, adjustment and maintenance thereof is simple so that durability of respective parts and reliability of actions can be favorably maintained.

The governor as illustrated in FIGS. 17 to 22 employing the governor link mechanism GL4 is arranged in that the sensor output arm 29 of a revolution speed sensor 25 for detecting a revolution speed of the engine output shaft 6 serving as a first movable member of the governor and a spring 340 serving as an elastic member are interposed at some midpoint of the wire 112 such that the engine output is controlled not only by detecting load torque generated in the transmission 4 but also by detecting the revolution speed of the engine output shaft 6.

Figure 16:
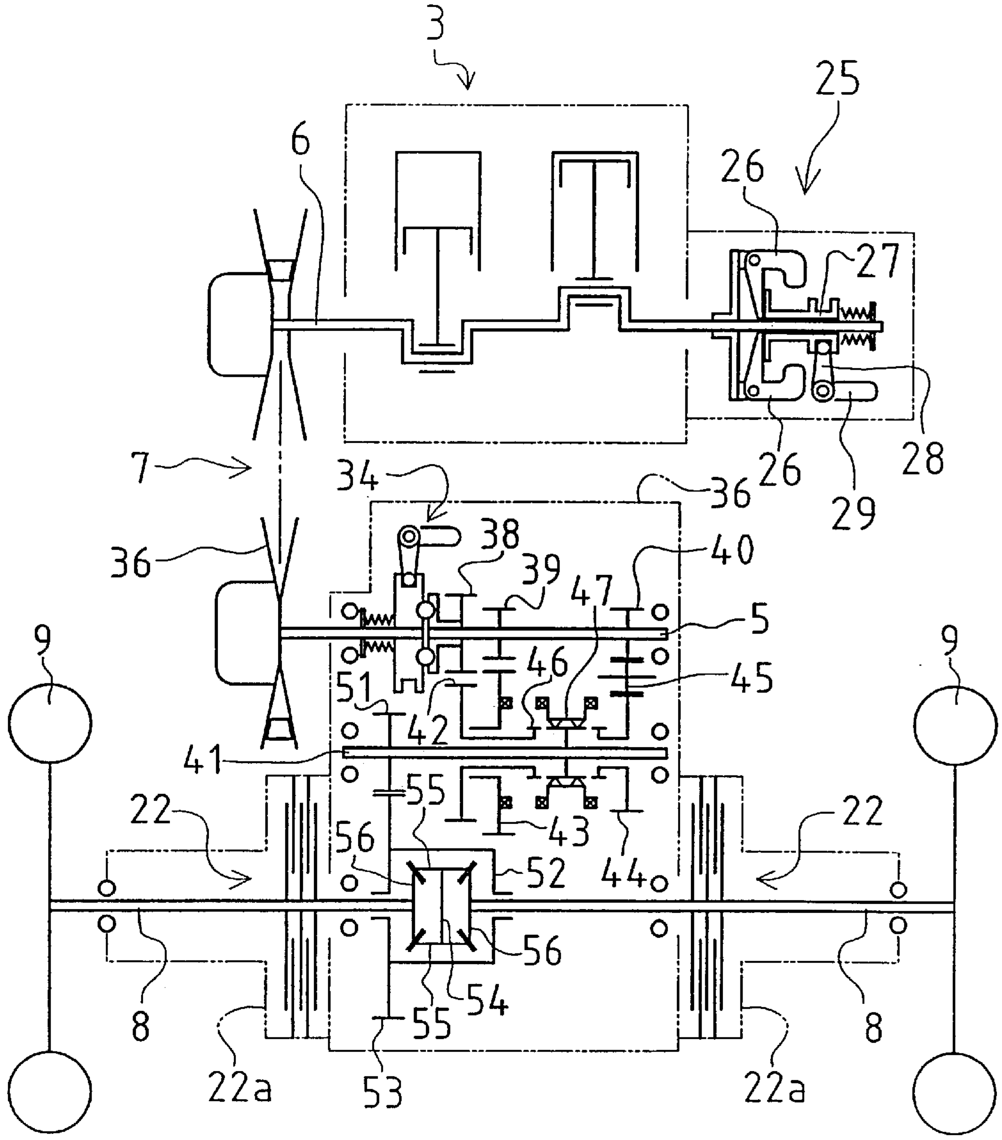
FIG. 16 is a skeleton view showing a structure of a transmission system to which the fourth and fifth embodiments of the load detecting type governor of the present invention is employed, the system comprising a revolution speed sensor (revolution speed detecting means) 25 that extends from an engine 3 to axles 8, wherein the load sensor 34 is provided at some midpoint of the transmission system 4 within the transmission case 31.

This governor arrangement is applied to an arrangement of a transmission system extending from the engine 3 to the axles 8 as illustrated in FIG. 16. In this transmission system, the engine 3 includes the revolution speed sensor 25 as used in ordinary centrifugal governors in addition to the load sensor 34 formed at some midpoint (between the input shaft 5 and the first transmission shaft 37) of the transmission 4 within the transmission case 31 as sensors for controlling the governor. Remaining arrangements of the CVT (belt-type CVT 7) and the transmission 4 are similar to those as illustrated in FIG. 1 or 2.

The internal arrangement of the revolution speed sensor 25 will now be explained. A flyweight 26 and a sliding sleeve 27 are mounted on the engine output shaft 6 (or a revolution shaft such as a valve-moving camshaft synchronously rotating with the output shaft 6) for sliding the sliding sleeve 27 on the output shaft 6 in a direction to an outer end thereof with the opening of the flyweight 26 through centrifugal force in accordance with increases in revolution speed of the output shaft 6. A fork 28 and the sensor output arm 29 are integrally formed with each other and are pivotally supported by a single pivotally supporting shaft in a freely oscillating manner, wherein a tip end of the fork 28 is engaged with the sliding sleeve 27 such that the sensor output arm 29 is oscillated accompanying the oscillation of the fork 28 together with the sliding of the sliding sleeve 27.

The link mechanism of the governor link mechanism GL4 in the governor as illustrated in FIGS. 17 to 22 between the output rod 301 and the throttle lever 131 achieved by the sensor output arm 29 and others will now be explained. The wire 112 for adjusting the throttle is split into a first wire 112*a*, a second wire 112*b*, and a third wire 112*c*. It should be noted that the first wire 112*a* and the second wire 112*b* might be replaced by a rod. The third wire 112*c* is interposed between the sensor output arm 29 and the throttle lever 131, wherein the throttle lever 131 is pulled via the third wire 112*c* for opening the throttle valve 130 the more the sensor output arm 29 is rotated through decreases in engine revolution speed as detected by the revolution speed sensor 25. The second wire 112*b* is extended from the sensor output arm 29 towards the oscillating direction of the sensor output arm 29 accompanying increases in a detected value of the revolution speed sensor 25, that is, towards the output rod 301, and the spring 340 is interposed between the first wire 112*a* extending from the tip end of the output rod 301 to the sensor output arm 29 and the second wire 112*b* as an elastic member.

The spring 340 absorbs tensile force applied on the sensor output arm 29 by the output rod 301 through expansion when the output rod 301 and the first wire 112*a* are initially moved rightward owing to depression of the accelerator pedal 21 or detection of load torque by the load sensor 34 for preventing the sensor output arm 29 being abruptly and forcibly pulled by the second wire 112*b* and thus preventing the sensor output arm 29 from being damaged.

It is also possible to eliminate the first wire 112*a* and the second wire 112*b* and to directly connect the sensor output arm 29 and the output rod 301 through the spring 340.

In this manner, the governor as illustrated in FIG. 17 and others is arranged with the revolution speed sensor 25, as used in conventional centrifugal governors, being interposed in a link system between the throttle lever 131 and the output end of the governor link mechanism GL4. More particularly, the arrangement employs an engine with a conventional centrifugal governor for enabling control of the governor by detecting revolution speeds. Though the sensor output arm 29 of the conventional revolution speed sensor 25 (governor arm in an ordinary centrifugal governor) would be forcibly oscillated through the depression of the accelerator pedal 21 except for oscillation in accordance with the opening of the flyweight 26, it is possible to perform forcible oscillation of the sensor output arm 29 in the present embodiment upon detection of load torque by the load sensor 34 in addition to depressing the accelerator pedal 21.

With this arrangement, when the vehicle is, for instance, starting uphill running, the sensor output arm 29 is forcibly oscillated to a side for opening the throttle upon detection of load torque by the load sensor 34 without awaiting actual detection of decreases in engine output revolution speed by the revolution speed sensor 25, and it is possible to make the engine output correspond to the uphill running at an early stage.

In addition, when the vehicle is driving downhill, the load sensor 34 will detect no load torque but the revolution speed sensor 25 will detect increases in revolution speed of the output shaft 6 so as to decrease the opening of the throttle for performing engine output control using an ordinary centrifugal governor.

Such effects may be also achieved in the above-described governor employing the governor link mechanism GL1 as illustrated in FIG. 5 or the governor employing the governor link mechanism GL2 as illustrated in FIG. 6 and others, and the governor employing the governor link mechanism GL3 as illustrated in FIG. 14 by similarly interposing the sensor output arm 29 of the revolution speed sensor 25 and the spring 340 at some midpoint of the wire 112 connected to each throttle lever 131.

In the governor as illustrated in FIGS. 17 to 22, rotation of the sensor output arm 29 is controlled, as explained above, upon depressing operations of the accelerator pedal 21 or detection of load torque by the load sensor 34. This will be further explained.

FIG. 17 illustrates a view wherein both the accelerator pedal 21 and the sensor output arm 78 are in their initial positions, and since neither the wire 111 nor the wire 113 are pulled, the link plate 302 rests against the first stopper 311 and the second stopper 312 and assumes a vertical posture with respect to the guide member 310 (initial condition) through tensile force of the return spring 321. The position of the sensor output arm 29 and the opening of the throttle valve 130 at this time are set to correspond to those for idling rotation of the output shaft 6.

Figure 18:
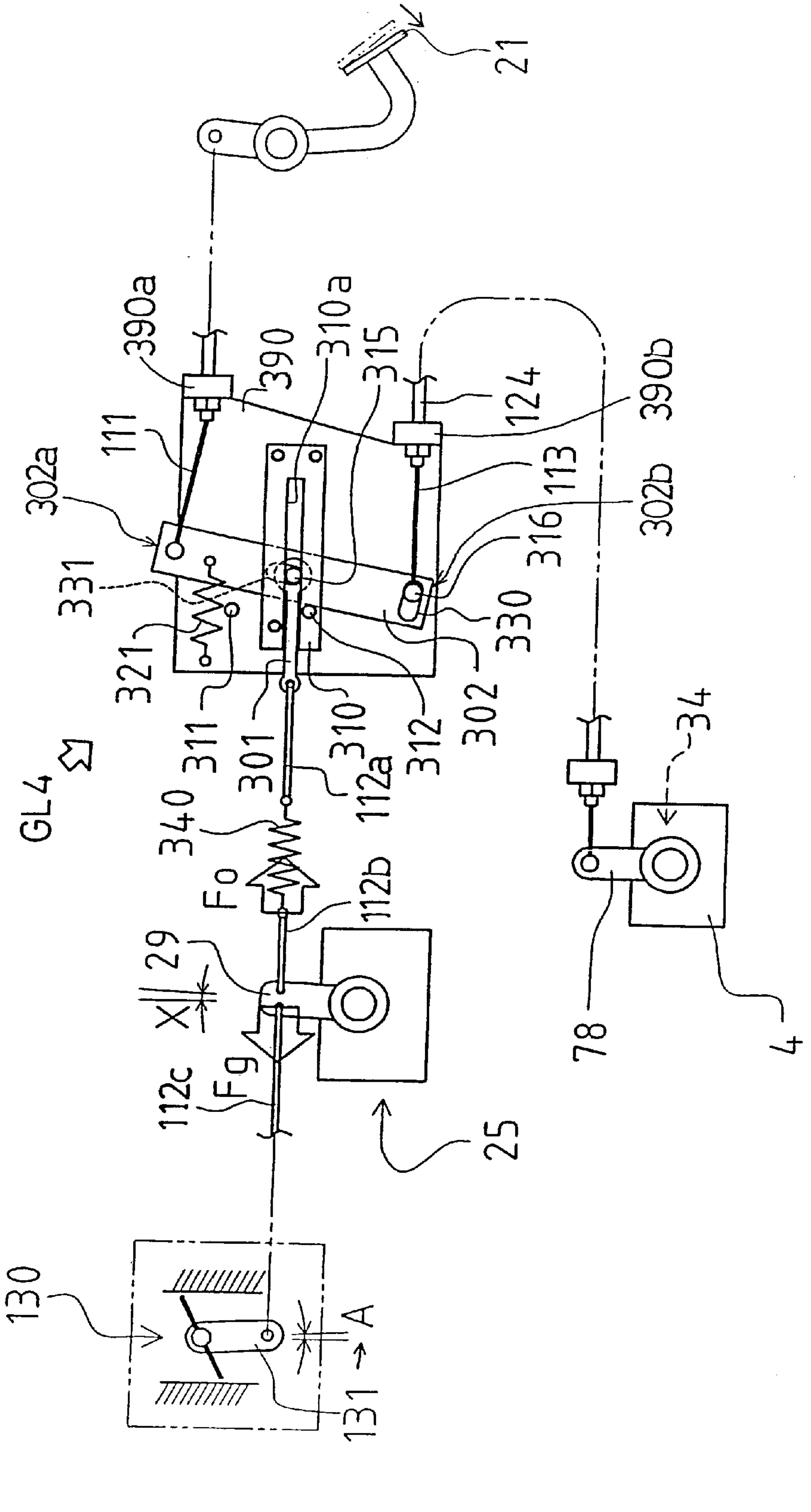
FIG. 18 is a similar view in which no load torque is detected by the load sensor 34, wherein a sensor output arm 29 is pulled by an output rod 31 with a balance between a returning force of a revolution speed sensor 25 and a spring 340 being lost through displacement of the slightly depressed acceleration pedal 21.
Figure 19:
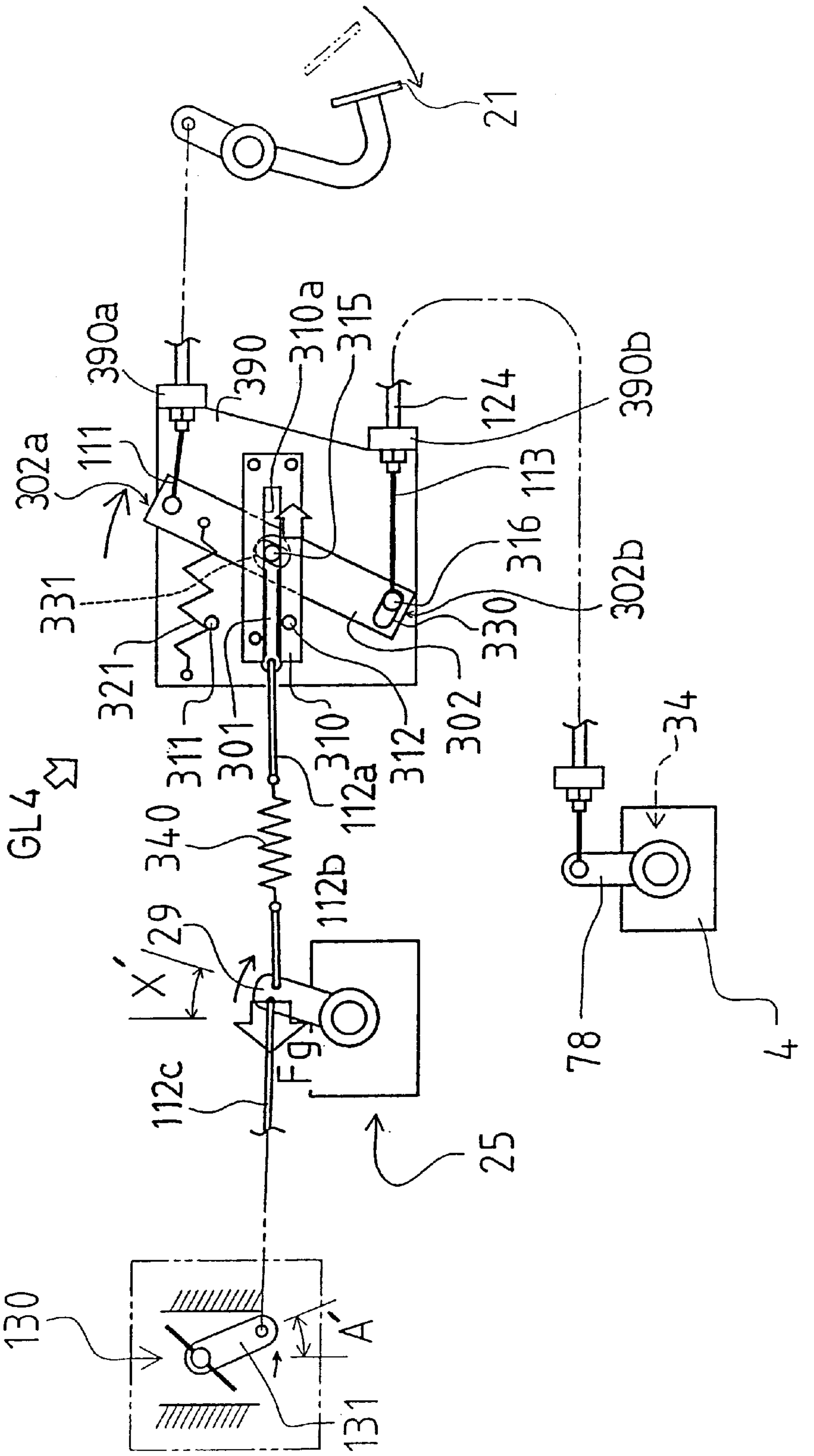
FIG. 19 is a similar view in which no load is detected by the load sensor 34, the accelerator pedal 21 is largely depressed, and a link plate 302 of the governor link mechanism GL4 is separated from a second stopper 312.

Presuming that the load sensor 34 is in a condition in which it does not detect load torque, the wire 111 extending from the accelerator pedal 21 pulls the first end portion 302*a* of the link plate 302 in a rightward direction in depressing the accelerator pedal 21 from the initial position. Through this tensile force, the link plate 302 is rotated with the second stopper 312 being the fulcrum as illustrated in FIG. 18 in a stage in which the amount of depressing the accelerator pedal 21 is small. During this rotation, the sliding pin 316 that was initially located at a left end within the elongated hole 330 is relatively moved rightward and finally reaches the right end within the elongated hole 330. By further increasing the amount of depressing the accelerator pedal 21, the link plate 302 is rotated as illustrated in FIG. 19 with the sliding pin 316 located on the right end within the elongated hole 330 being the fulcrum, and moves away from the second stopper 312.

Accompanying the rightward rotation of the first end portion 302*a* of the link plate 302 upon depressing the accelerator pedal 21, the connecting pin 315 at a central portion of the link plate 302 is moved rightward so that the output rod 301 is moved rightward in a linear manner.

When the accelerator pedal 21 is depressed to some extent and the sliding pin 316 is at the right end within the elongated hole 330, the wire 113 will pull the second end portion 302*b* of the link plate 302 rightward upon detection of load torque by the load sensor 34. The central portion of the link plate 302 at which the connecting pin 315 is located will accordingly move further rightward than the position as defined by the depression of the accelerator pedal 21. Thus, the output rod 301 is moved further rightward in a liner manner from the position corresponding to the amount of depression of the accelerator pedal 21.

When the accelerator pedal 21 is in the initial position or in the slightly depressed position, the sliding pin 316 is relatively located leftward of the right end of the elongated hole 330 when the load sensor 34 is in the initial condition. Further, the second end portion 302*b* is either not at all pulled by the wire 113 or is pulled upon rotation of the sensor output arm 78 by some extent (that is, upon increase of the detected value to some extent) when load torque is detected by the load sensor 34 in this condition.

When the wire 111 or wire 112 pulls the link plate 302, the connecting pin 315 is freely movable within the elongated hole 331 such that the link plate 302 is freely oscillating while the connecting pin 315 is moved rightward in a linear manner as described above.

Actions of the leftward movement of the output rod 301 on the sensor output arm 29 will now be explained. At an initial stage of depressing the accelerator pedal 21 or the rightward movement of the output rod 301 (and the first wire 112*a*) upon detection of load torque by the load sensor 34 (to be described later), the spring 340 is expanded and will try to restore through shrinking thereafter. This shrinking force acts as tensile force Fo for rotating the sensor output arm 29 rightward in the drawing. The sensor output arm 29 is accordingly rotated rightward. In this manner, the sensor output arm 29 is forcibly pulled through tensile force Fo obtained by easing rigid tensile force by the output rod 301 through elasticity of the spring 340 and is oscillated rightward without causing damages. When the amount of depression of the accelerator pedal 21 is being increased, the sensor output arm 29 is rotated rightward while a phenomenon of the spring 340 of expanding and restoring is intermittently repeated, and the sensor output arm 29 will constantly receive tensile force Fo when the accelerator pedal 21 is finally maintained in a specified depressing position.

The opening of the throttle valve 130 becomes larger through the rightward rotation of the sensor output arm 29. Since the revolution speed of the output shaft 6 will be increased by this effect and the revolution speed sensor 25 detects the increase in revolution speed, the sensor output arm 29 is oscillated leftward for decreasing the opening of the throttle valve 130. Thus, the sensor output arm 29 receives oppositely acting force, that is, tensile force Fo applied thereon by the output rod 301 via the spring 340 acting in the rightward direction and a force Fg acting in the leftward direction for making the sensor output arm 29 oscillate on a basis of revolution speed detection of the revolution speed sensor 25 itself (hereinafter referred to as "governor force").

Since the tensile force Fo is set to be larger than the governor force Fg, the sensor output arm 29 is first oscillated rightward by the tensile force Fo but will finally rest at a position where the tensile force Fo, which becomes less in being oscillated in the rightward direction, and governor force Fg are balanced. More particularly, a moving amount of the output rod 310 in accordance to depression of the accelerator pedal 21 or detection of load torque by the load sensor 34 is decrement by an amount corresponding to the detected value of the revolution speed sensor 25 to define a final tilt angle of the sensor output arm 29. The position of the sensor output arm 29 as illustrated in FIGS. 19 to 22 illustrates a resting position with the tensile force Fo and governor force Fg being in equilibrium.

Forms for controlling the governor in accordance with various driving conditions of the vehicle as illustrated in each of FIGS. 17 to 22 will now be explained.

FIG. 17 illustrates a case in which the vehicle is in a halting condition with the engine performing idling rotation, for instance, when starting the engine. As explained above, the position of the sensor output arm 29 and the opening of the throttle valve 130 are maintained in conditions with which idling rotation of the output shaft 6 is maintained.

When the vehicle with the governor being set in the initial condition is started running on flat ground, as illustrated in FIG. 18, and the accelerator pedal 21 is slightly depressed, the link plate 302 will rotate with the second stopper 312 being the fulcrum to move the output rod 301 rightward, the sensor output arm 29 is tilted rightward by angle X from the initial position (as illustrated in FIG. 18) up to a position where it is finally rested with the tensile force Fo and governor force Fg being in equilibrium, and the opening of the throttle valve 130 will be increased by A in accordance therewith. At this time, hardly any running resistance is generated and the load sensor 34 is substantially maintained in the initial condition such that the sensor output arm 29 will not be rotated rightward beyond rotation angle X as defined by the accelerator pedal 21.

When the accelerator pedal 21 is further depressed to a position as illustrated in FIG. 19 on a normal flat road for increasing the running speed of the vehicle, the link plate 302 rotates rightward by parting from the second stopper 312 with the sliding pin 316 abutting the right end of the elongated hole 330 being the fulcrum. Since no load torque is yet generated in the transmission 4, the sensor output arm 78 is still maintained in the initial position, the sensor output arm 29 is rested at rotating angle X' corresponding to only the depression of the accelerator pedal 21, and the opening of the throttle valve is set to opening A' corresponding to the depression of the accelerator pedal 21.

Figure 20:
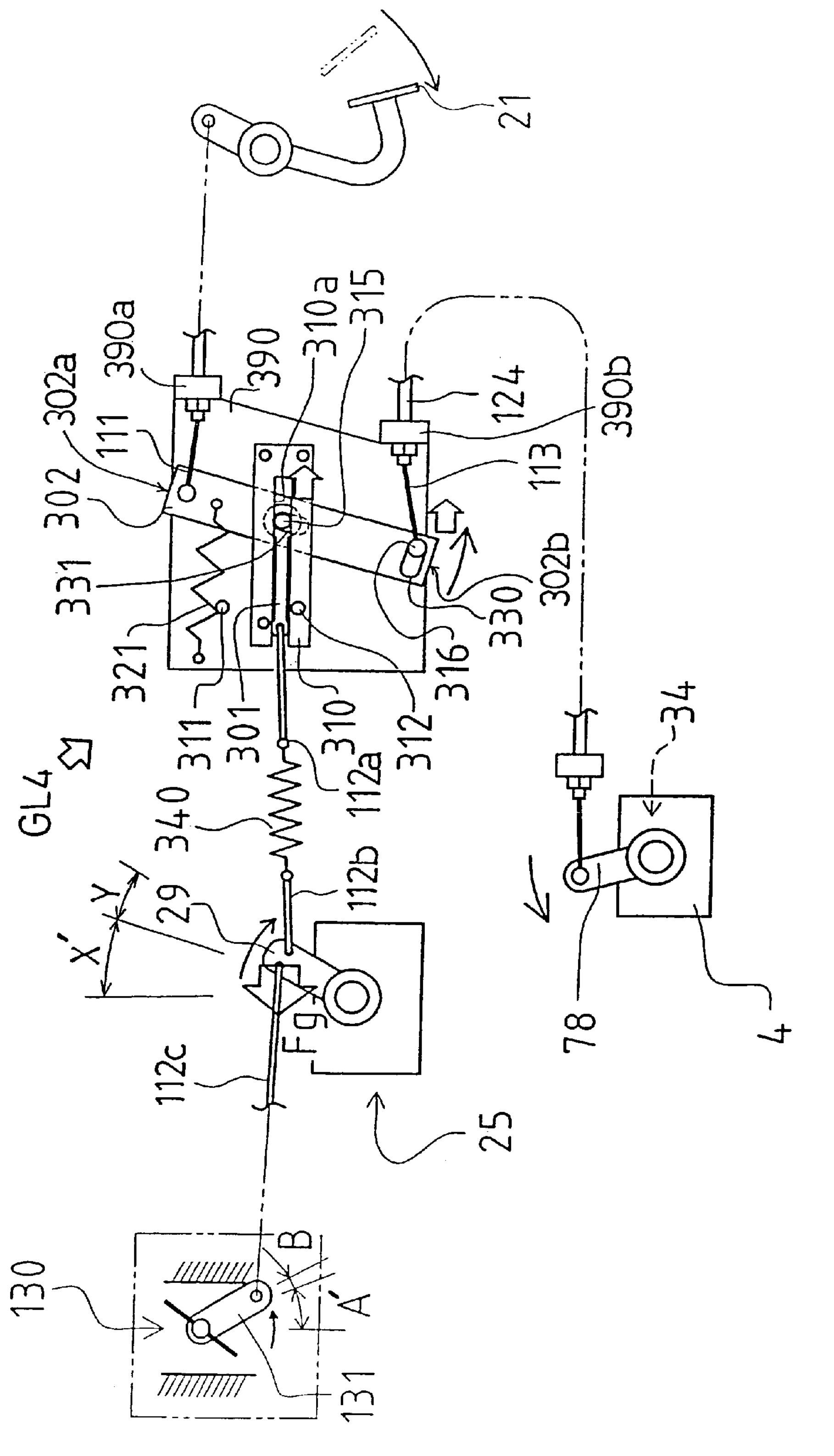
FIG. 20 is a similar view in which the accelerator pedal 21 is depressed, load torque is detected by the load sensor 34, and opening control of the throttle valve 130 is performed on a basis of the detection.

When the depressed position of the accelerator pedal 21 is maintained as illustrated in FIG. 19 and the running vehicle starts, for instance, uphill running such that rotational resistance is applied on the wheels, load torque is generated in the transmission 4 such that the sensor output arm 78 of the load sensor 34 rotates as illustrated in FIG. 20. At this stage, the sliding pin 316 is located at the right end of the elongated hole 330 wherein the sliding pin 316 pulled by the wire 113 presses the second end portion 302*b* of the link plate 302 rightward as soon as rotation of the sensor output arm 78 is started. Accordingly, the output rod 301 is further moved rightward from the position as defined by the depression of the accelerator pedal 21 and the sensor output arm 29 is rotated further rightward from rotating angle X'.

It should be noted that it is generally the case that the engine output revolution speed is decreased when load torque is applied, and the moving direction of the output rod 301 by oscillation of the sensor output arm 78 and the oscillating direction of the sensor output arm 29 upon detection of the revolution speed by the revolution speed sensor 25 are coincident. Thus, if the revolution speed is actually decreasing when load torque is detected by the load sensor 34, it is assumed that the governor force Fg is rather applied onto the sensor output arm 29 rather in the same direction as the tensile force Fo. However, it may be that abrupt pulling of the sensor output arm 29 upon detection of load torque by the load sensor 34 will occur earlier than actual decreases in revolution speed due to the rotational resistance applied on the wheels. At this time, the spring 340 will expand for avoiding abrupt rightward oscillation of the sensor output arm 29, and if the revolution speed should be increased, the sensor output arm 29 will receive governor force Fg in an opposite direction as the tensile force Fo through the output rod 301 and the spring 340 to thereby decrease the output revolution speed in a smooth manner. Thus, it can be avoided that the revolution speed of the output shaft 6 is abruptly increased to be higher than the set revolution speed by the accelerator through governor control upon detection of load torque at an initial stage of uphill running, and the actual revolution speed will effectively be equivalent to the revolution speed as set by the accelerator. In any event, the sensor output arm 29 is oscillated further rightward from the oscillating angle X', corresponding to the amount of depressing the accelerator pedal 21, by oscillating angle Y, and the opening of the throttle valve 130 will be further increased from angle A' corresponding to the oscillating angle X' by angle B corresponding to the oscillating angle Y for increasing the engine output.

Control of the governor through detection of load torque by the load sensor 34 will be performed prior to the centrifugal governor control that is performed upon actual detection of decrease in revolution speed by the revolution speed sensor 25. Consequently, when the vehicle is starting uphill running as in the above-described case, load torque will be abruptly applied on the transmission 4 which is detected by the load sensor 34, and the engine output is increased prior to the detection of a decrease in revolution speed of the output shaft 6 by the rotation speed sensor 25 upon actual decreases in the revolution speed of the wheels so that it is possible to obtain an engine output suitable for uphill running as soon as the vehicle starts uphill running.

It should be noted that when performing uphill running of a steep hill, the engine revolution speed might become lesser than that when running on a flat road even though the accelerator pedal 21 is fully depressed. At this time, performing control for further opening the throttle valve 130 than an opening corresponding to a maximum revolution speed set for the engine will not immediately make the engine exceed its set maximum revolution speed to cause an overrun. Moreover, even if the engine revolution speed is increased by, for instance, shifting the transmission lever 20 in a low speed range suitable for uphill running, the engine revolution speed will be continuously observed by the revolution speed sensor 25 and controlling to close the throttle valve when the revolution speed is excess, so that the actual revolution speed of the engine can be reliably prevented from exceeding the set maximum revolution speed also when uphill running, and the engine can be reliably prevented from overrunning.

The fear of damaging the engine through overruns or the like is thus eliminated upon performing the above control, and it is rather possible to exhibit a maximum potential of the engine to make the vehicle perform uphill running in an even more agile manner.

Figure 21:
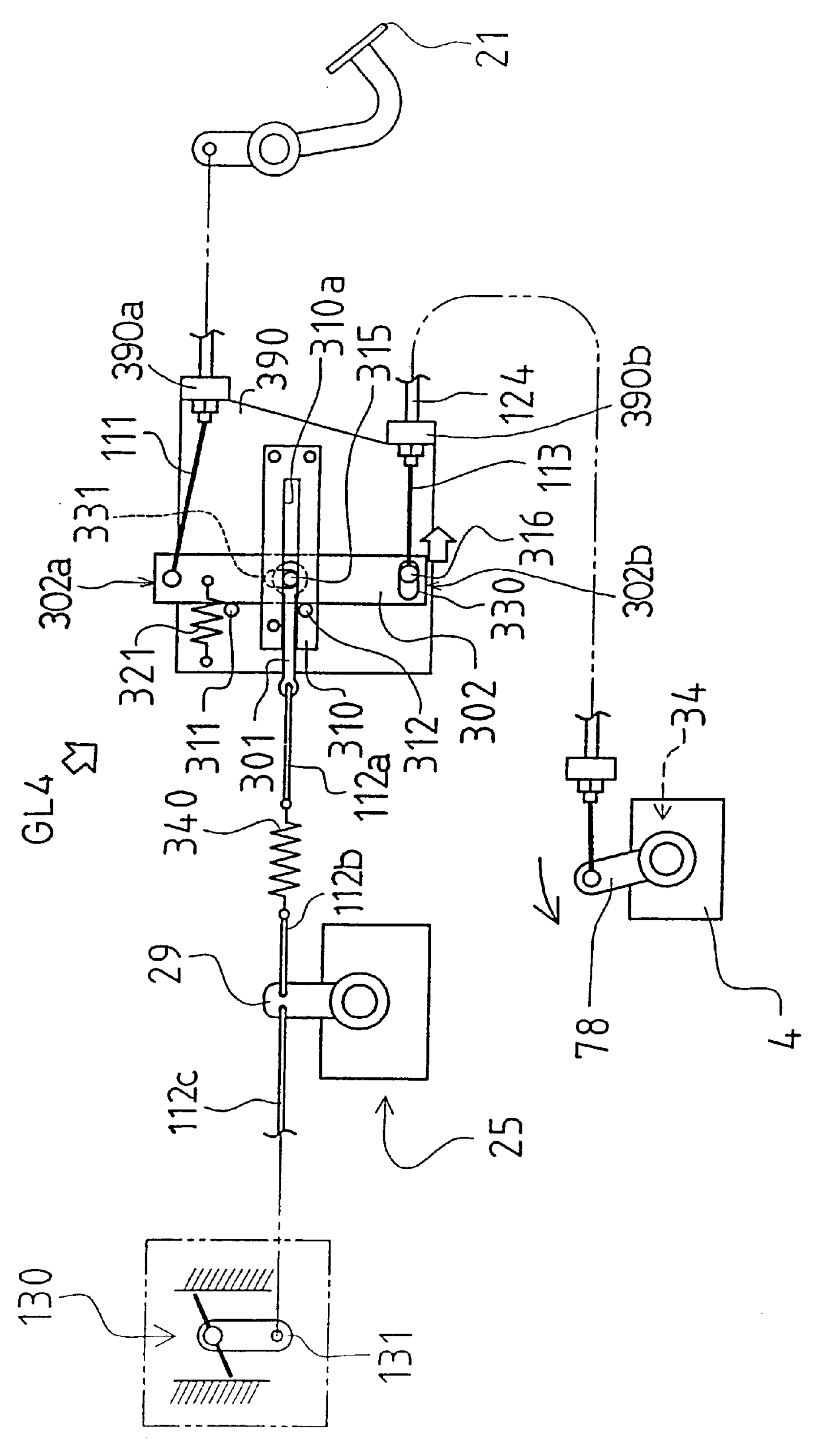
FIG. 21 is a similar view wherein the accelerator pedal 21 is in the initial position and load torque is detected by the load torque 34.

When depressing of the accelerator pedal 21 in the condition as illustrated in FIG. 19 and others is terminated for braking operations or abrupt deceleration, the link plate 302 will smoothly return to the initial position at which it abuts the first stopper 311 and the second stopper 312 as illustrated in FIG. 21 through urging force of there turn spring 321. At this time, rotational resistance is applied on the wheels whereupon the load sensor 34 detects load torque and the sensor output arm 78 is rotated, but the sliding pin 316 is only slid within the range of play in the elongated hole 330 even upon maximum rotation so that the link plate 302 is maintained in the initial position. Upon revolution speed detection by the revolution speed sensor 25 at this time, the sensor output arm 29 is oscillated leftward through governor force Fg and finally assumes the idling position. The output will thus not be increased against the will of the operator who returned the accelerator pedal 21 for braking or deceleration and the braking distance or deceleration time will not be appropriately increased.

It should be noted that when the accelerator pedal 21 is located between the initial position as illustrated in FIG. 17 and the depressed position as illustrated in FIG. 18, the sliding pin 316 is located between the left end and the right end of the elongated hole 330 wherein the clearance formed between the sliding pin 316 and the right end of the elongated hole 330 will provide the play for response movements of the second end portion 302*b* of the link plate 302 with respect to the rotation of the sensor output arm 78. This amount of play will decrease with increases in the amount of depressing the accelerator pedal 21 from the initial position as illustrated in FIG. 17 and will vanish when the depressed position as illustrated in FIG. 18 is reached.

In case the value of the load torque detected by the load sensor 34 is small and the sliding pin 316 pulled by the wire 113 is moved between the clearance formed between itself and the right end of the elongated hole 330, the second end portion 302*b* will not be moved rightward and the rotation angle of the sensor output arm 29 will remain at the opening angle X' as defined by the depression of the accelerator pedal 21. When the detected value of the load sensor 34 is further increased and the sliding pin 316 has reached the right end of the elongated hole 330, the second end portion 302*b* moves rightward as explained in connection with FIG. 20, and the rightward rotation angle of the sensor output arm 29 becomes an angle that corresponds to the rotation angle X' defined by depressing the accelerator pedal 21 increment by rotation angle Y upon detection of the load sensor 34 for increasing the opening angle A' of the throttle valve 130 further by angle B.

In the low output set region of the accelerator pedal 21, the sensor output arm 29 responds and rotates with a certain lag with respect to the detection of the load sensor 34. The case as illustrated in FIG. 20 is a high-speed output condition wherein the output revolution speed difference generated upon decrease in output speed through load torque is large, and since the engine or transmission will be damaged, the opening of the throttle valve 130 is increased immediately upon receiving load torque. On the other hand, when the opening adjustment response of the throttle valve 130 with respect to load torque detection is set to be too sensitive in the low-speed output condition, the running speed will be varied in a frequent and detailed manner to make the operator feel unpleasant or to lead to decreases in operating accuracy. Thus, the opening increasing response of the throttle valve 130 with respect to detection of load torque is set to be dull by the positional relationship between the elongated hole 330 and the sliding pin 316.

FIG. 22 illustrates a view for controlling the governor in a condition wherein the accelerator pedal 21 is depressed to a maximum extent and the revolution speed of the output shaft 6 is increased beyond the rotation speed as set by the accelerator pedal 21 by, for instance, running down a hill. No load torque is detected in this condition, and the position of the link plate 302 or that of the output rod 301 is a position with which the sensor output arm 29 is oscillated rightward at the oscillating angle X" in accordance with depressing the accelerator pedal 21. However, since the actual revolution speed of the engine output shaft 6 exceeds the revolution speed as set by the accelerator, the revolution speed sensor 25 detects this increase in revolution speed and the governor force Fg for making the sensor output arm 29 oscillate leftward is increased so that the sensor output arm 29 rests at a position that is smaller by oscillating angle Z than the original oscillating angle X" set by the accelerator (that is, more leftward) to suit the amount of increase of the governor force Fg. The opening of the throttle valve 130 will accordingly be returned from the opening A" as set by the accelerator by opening C corresponding to the increase in governor force Fg so that the opening is closed for decreasing the actual revolution speed of the output shaft 6 so as not to exceed the maximum output revolution speed set in correspondence to the engine 3 and thus avoiding damages on the engine or transmission.

Figure 23:
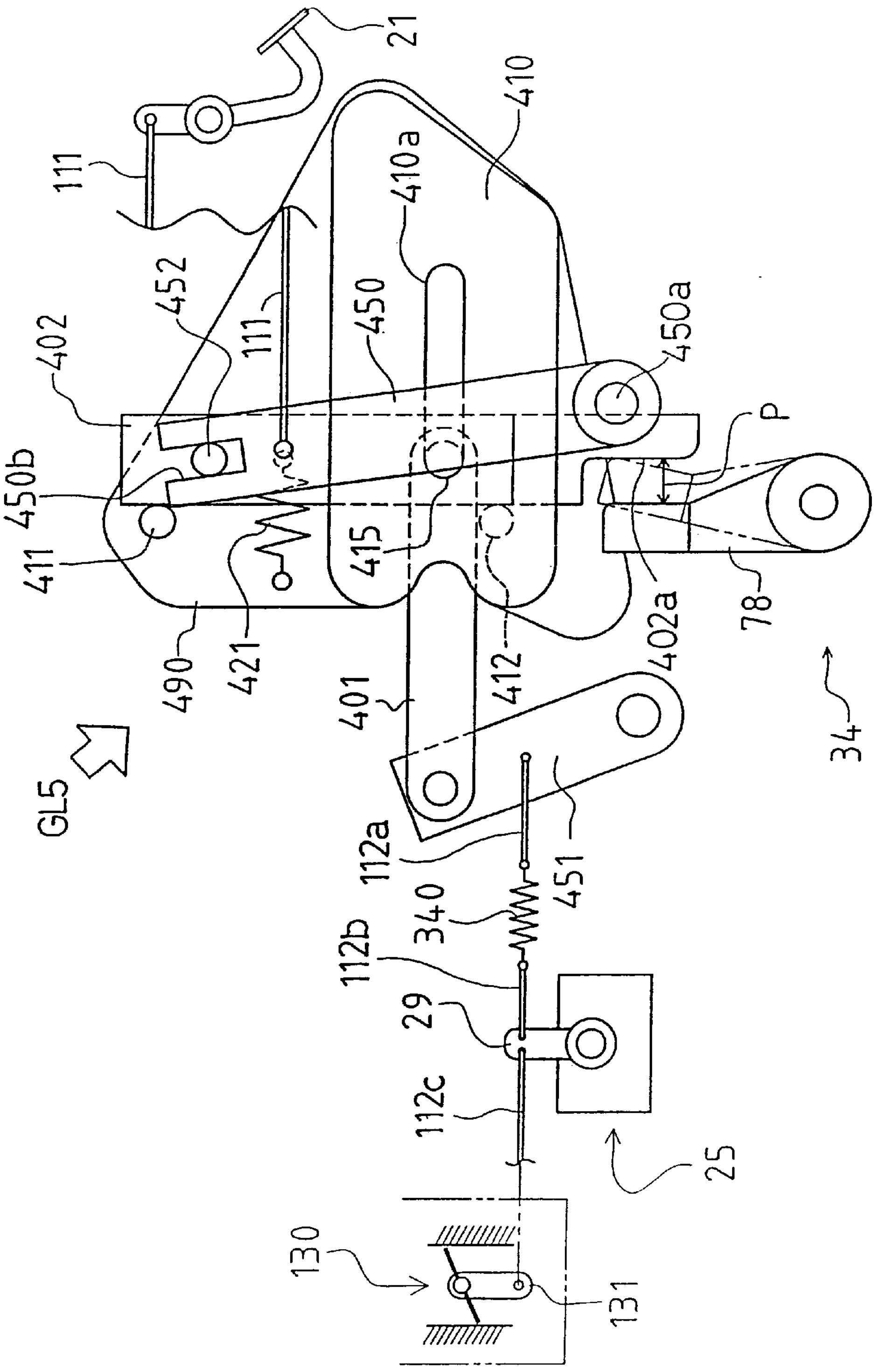
FIG. 23 is a systematic view of a fourth embodiment of the load detecting type governor of the present invention including a structural view of a governor link mechanism GL5 in an initial condition.
Figure 24:
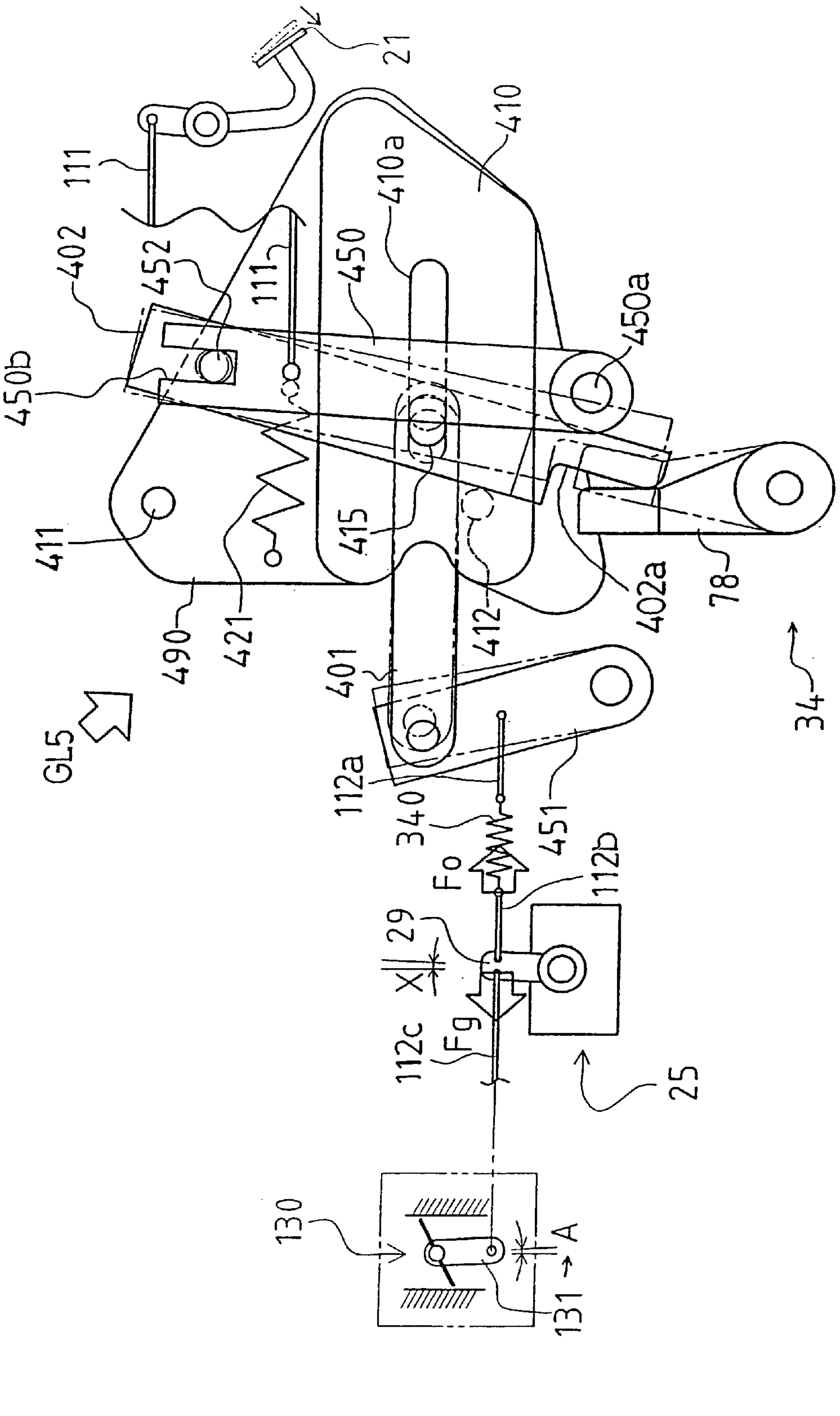
FIG. 24 is a similar view wherein the accelerator pedal 21 is depressed.

A governor employing a governor link mechanism GL5 as illustrated in FIGS. 23 and 24 will now be explained as another embodiment of a governor that is controlled upon detection of the revolution speed sensor 25 and the load sensor 34.

The governor link mechanism GL5 employed in this governor is arranged in that a flat guide member 410 is fixed on an upper surface of a base 490, wherein the guide member 410 is formed with a guide groove 410*a* and a connecting pin 415 is provided to be freely sliding along the guide groove 410*a*.

An output rod 401 is disposed on the base 490 with the connecting pin 415 being inserted into one end of the output rod 401 while the other end is pivotally connected to one end of an output arm 451. The other end of the output arm 451 is pivotally supported at a suitable position of the vehicle. Similarly to FIG. 17 and others, a link mechanism is arranged between a midpoint portion of the output arm 451 and the throttle lever 131 with the spring 340 or the sensor output arm 29 or the like of the revolution speed sensor 25 being interposed.

A slim and flat link plate 402 is disposed on the base 490 to be perpendicular to the guide groove 410*a*. The connecting pin 415 is mounted on a substantially central position of the link plate 402 wherein the link plate 402 is connected to the output rod 401 while being allowed to tilt or slide by a specified distance via the connecting pin 415.

An oscillating arm 450 is provided to substantially extend along the link plate 402. One end of the oscillating arm 450 (lower end in FIG. 23) is fixed in position and is pivotally supported with respect to the base 490 by a pivotally supporting shaft 450*a*. The wire 111 extending from the accelerator pedal 21 is connected to a portion of the oscillating arm 450 that is closer to the upper end of the oscillating arm 450 in FIG. 23 and thereby rotates the upper end about the pivotally supporting shaft 450*a*. The more the accelerator pedal 21 is depressed, the more rightward does the upper end oscillate with the center being the pivotally supporting shaft 450*a*. A guide groove 450*b* is notched into an oscillating end of the oscillating arm 450 and a pin 452 is provided to project from proximate of one end of the link plate 402 (upper end in FIG. 23) that is fitted and inserted into the guide groove 450*b* in a freely sliding manner. Therefore, when the accelerator pedal 21 is depressed, the oscillating arm 450 is rotated from the position as illustrated in FIG. 23 in a clockwise direction for pressing the one end of the link plate 402 (the end from which the pin 452 is projecting) in a clockwise direction via the pin 452.

A pressing portion 402*a* is formed at the other end of the link plate 402 (lower end in FIG. 23) wherein the pressing portion 402*a* is suitably pressed against the sensor output arm 78 when the link plate 402 is oscillated accompanying the oscillation of the oscillating arm 450 or the oscillation of the sensor output arm 78 upon detection of load by the load sensor 34. The sensor output arm 78 is disposed leftward of the pressing portion 402*a* in FIG. 23 and is arranged to oscillate clockwise (rightward) with increases in the detected value of the load torque.

A return spring 421 is interposed between the base 490 and the link plate 402. The link plate 402 rests wherein an edge thereof is abutted against a first stopper 411 and a second stopper 412 provided on the base 490 and vertical to the guide groove 410*a* by the urging force of the return spring 402. This condition is the initial condition of the link plate 402. At this time, a suitable clearance P is provided between the pressing portion 402*a* of the link plate 402 and an output arm 78. When the accelerator pedal 21 is not at all depressed, the sensor output arm 78 will not be pressed against the pressing portion 402*a*, as illustrated by the chain line in FIG. 23, even though it performs full rotation upon detection of load torque, and the mounting position for the sensor output arm 78 (amount of clearance P) is adjusted such that the link plate 402 is not pressed if the arm should abut the pressing portion.

Positions of the link plate 402 and the oscillating arm 450 are illustrated through solid lines in FIG. 24 when the accelerator pedal 21 is slightly depressed. In this case, the oscillating arm 450 is rotated for pressing the upper end of the link plate 402 via the pin 452, the link plate 402 is tilted with the second stopper 412 being the center, and the connecting pin 415 provided at some midpoint of the link plate 402 is slid along the guide groove 410*a* to pull the output rod 401. The output rod 401 rotates the output arm 451 for pulling the sensor output arm 29 of the revolution speed sensor 25 via the spring 340 for finally opening the throttle valve 130 upon rotation of the throttle lever 131.

In addition, when the accelerator pedal 21 is depressed beyond a certain point, the pressing portion 402*a* of the link plate 402 is moved closer to the output arm 78, as illustrated by the solid line in FIG. 24, by the oscillation of the link plate 402 in a clockwise direction with the second stopper 412 being the pivot point such that the clearance P vanishes. Thus, by the further rotation of the sensor output arm 78 in a clockwise direction upon detection of load torque, in a manner as illustrated by the virtual line in FIG. 24, the sensor output arm 78 abuts against the end portion of the link plate 402 to press the same at its tip end. Consequently, the connecting pin 415 located centrally on link plate 402 is slid within the guide groove 410*a* by a corresponding amount so that the output rod 401 is pulled and the opening of the throttle valve 130 is controlled to be increased.

In other words, clearance P is made to exhibit similar effects as the play provided by the elongated hole 330 in the governor link mechanism GL4. More particularly, when the accelerator pedal 21 is proximate to its idling position, the detection of the load sensor 34 is cancelled by the clearance P.

The governor link mechanism GL5 of the above arrangement exhibits similar effects as the above-described governor link mechanism GL4, and the governor employing this mechanism as illustrated in FIGS. 23 and 24 similarly controls the throttle valve 130 of the engine as the above-described governor as illustrated in FIGS. 17 to 22.

The above-described fourth embodiment as illustrated in FIGS. 17 to 22 and the fifth embodiment as illustrated in FIGS. 23 and 24 related to the governors of the present invention will now be summarized. Each governor is arranged by linking the accelerator pedal 21 (an output setting means), the throttle valve 130 (an output adjusting means), the revolution speed sensor 25 (a setting means for the output revolution speed of the engine), and the load sensor 34 (for detecting load torque generated in the transmission 4). The revolution speed sensor 25 is comprised with the sensor output arm 29 as a first movable member that is displaced upon detection of revolution speed, and the first movable member is linked to the accelerator pedal 21 such that the throttle valve 130 may be displaced to the output decreasing side in accordance with increases in the detected value of the revolution speed sensor 25. The output rod 301 or 401 is provided as a second movable member that is displaced in one direction with increases in the set value of the accelerator pedal 21, wherein the second movable member is linked to the load sensor 34 such that the position defined by the set value of the accelerator pedal 21 is further displaced in the one direction upon detection of load torque by the load sensor 34. The first movable member and the second movable member are further linked such that a displacement direction of the second movable member accompanying increases in the set value of the accelerator pedal 21 and the detected value of the load sensor 34 and a displacement direction of the first movable member accompanying the increase in detected value of the revolution speed sensor 25 are opposite with respect to each other, and the first movable member is arranged to be displaced upon displacement of the second movable member by an amount decrement by a displacement amount on a basis of detection of the revolution speed sensor 25.

In these arrangements, the spring 340 is interposed between the first movable member and the second movable member as an elastic member.

A play is provided in the linkage between the load sensor 34 and the second movable member such that the second movable member is not displaced upon detection of load even though the load torque is detected by the load sensor 34 when the set value of the accelerator pedal 21 is an initial value or a specified low output set region including the initial value.

The play between the load sensor 34 and the second movable member decreases and subsequently vanishes with increases in the set value for the accelerator pedal 21 beyond the initial value or the low output set region including the initial value.

The above explanations have been made with reference to mechanical governors using load sensor 34. One example of an electronic governor that may be arranged by using the load sensor 34 will be mentioned at last.

The amount of depressing the accelerator pedal 21 and the oscillating amount of the sensor output arm 78 is made to be detected by potentiometers while the opening of the throttle valve 130 is arranged to be changed and operated by an electric actuator. Detection signals from the respective potentiometers are input to a controller for outputting driving signals to the electric actuator for determining whether the accelerator pedal 21 has reached a specified stroke region from a low speed position, and control is performed in an electric manner for canceling or dulling detection signals from the output arm 78 when the stroke region has been reached.

While the present invention has been explained based on various embodiments thereof, it is obvious for a person skilled in the art that the additive or substituting variations in forms or details of the invention are possible without departing from the spirit and scope of the claims of the present invention.

What is claimed is:

1. A load detecting governor mechanism for a vehicle engine, comprising:

an output setting device for setting an output value for the engine, an output adjusting device for adjusting an output of the engine based on a value set by the output setting device, a load detecting device provided on a transmission system for driving a vehicle extending from the engine to axles, for detecting an amount of load torque generated through rotational resistance applied on the axles and transmitted from the axles to the engine through the transmission system, and a governor link mechanism interlockingly connecting the output setting device, the output adjusting device and the load detecting device with one another, wherein the engine output is controlled to increase in response to the generated load torque by displacing a position of the output adjusting device as defined by the output setting device to an output increasing side in accordance with a selected value when load torque is detected by the load detecting device, and wherein the governor link mechanism is constructed so that the output adjusting device is maintained at the position as defined by the output setting device even upon detection of load torque by the load detecting device when the set value of the output setting device is an initial value or in a specified low output set region including the initial value.

2. The load detecting governor mechanism as recited in claim 1, wherein a response speed of the output adjusting device with respect to load detection of the load detecting device is increased with increases in the set value by the output setting device beyond the initial value or the specified low output set region including the initial value.

3. The load detecting governor mechanism as recited in claim 1, wherein the governor link mechanism is provided with a movable member that is linked to the output adjusting device and that is displaced on a basis of the set value of the output setting device, wherein the movable member is further connected to the load detecting device and the output setting device is further displaced to the output increasing side by further displacing a position of the movable member as defined by the set value of the output setting device upon detection of load torque by the load detecting device, and wherein the governor link mechanism is provided with a play between the load detecting device and the movable member such that the movable member is not displaced upon detection of load even though the load torque is detected by the load detecting device when the set value of the output setting device is the initial value or in the specified low output set region including the initial value.

4. The load detecting governor mechanism as recited in claim 3, wherein the play between the load detecting device and the movable member is decreased and vanished with increases in the set value of the output setting device beyond the low output set region.

5. The load detecting governor mechanism as recited in claim 3, wherein the movable member is incorporated in a housing in which the transmission system is incorporated.

6. A load detecting governor mechanism for a vehicle engine, comprising:

an output setting device for setting an output value for the engine, an output adjusting device for adjusting an output of the engine based on a value set by the output setting device, a revolution speed detecting device for detecting an output revolution speed of the engine, a load detecting device provided in a transmission system for driving a vehicle extending from the engine to axles, for detecting an amount of load torque generated through rotational resistance applied on the axles and transmitted from the axles to the engine through the transmission system, and a governor link mechanism including a first link and a second link, wherein the first link operatively connects the output adjusting device with the revolution speed detecting device so as to displace the output adjusting device to an output decreasing side accompanying increases in the detected value of the revolution speed detecting device, wherein the second link operatively connecting the output setting device with the load detecting device so as to be displaced in one direction with increases in the set value of the output setting device, is further displaced in the one direction upon detection of load torque by the load detecting device, and wherein the first link and the second link are linked such that a displacement direction of the second link accompanying the increase in detected value of the revolution detecting device are opposite wit respect to each other, and that the first link is displaced upon displacement of the second link by an amount decrement by the displacement amount on a basis of detection of the revolution speed detecting device.

7. The load detecting governor mechanism as claimed in claim 6, wherein an elastic member is interposed between the first link and the second link.

8. The load detecting governor mechanism as claimed in claim 6, wherein the governor link mechanism is provided with a play between the load detecting device and the second link such that the second link is not displaced upon detection of load even though load torque is detected by the load detecting device when the set value of the output setting device is the initial value or in the specified low output set region including the initial value.

9. The load detecting governor mechanism as claimed in claim 8, wherein the play between the load detecting device and the second link is decreased and vanished with increases in the set value of the output setting device beyond the initial value or the specified low output set region including the initial value.

* * * * *